(12) United States Patent
Yoshida

(10) Patent No.: US 6,275,308 B1
(45) Date of Patent: Aug. 14, 2001

(54) FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/802,418

(22) Filed: Feb. 18, 1997

Related U.S. Application Data

(63) Continuation of application No. 08/183,397, filed on Jan. 19, 1994, now abandoned.

(30) Foreign Application Priority Data

Jan. 20, 1993 (JP) .................................................... 5-007144

(51) Int. Cl.⁷ .............................. H04N 1/387; H04N 1/04
(52) U.S. Cl. .......................... 358/450; 358/434; 358/444; 358/474; 358/468
(58) Field of Search .................................... 358/468, 405, 358/464, 498, 437, 441, 434–436, 438, 440, 401, 445, 448, 406, 404, 444, 296, 450; 399/82, 374, 18, 45; 395/114

(56) References Cited

U.S. PATENT DOCUMENTS

| | | | |
|---|---|---|---|
| 4,494,149 | * 1/1985 | Furukawa | 358/405 |
| 4,554,592 | 11/1985 | Yoshida | 358/257 |
| 4,609,927 | 9/1986 | Yoshida | 346/154 |
| 4,677,660 | 6/1987 | Yoshida | 379/100 |
| 4,727,576 | 2/1988 | Yoshida | 379/100 |
| 4,839,740 | * 6/1989 | Yoshida | 358/498 |
| 4,903,146 | * 2/1990 | Nakabara | 358/468 |
| 5,105,285 | * 4/1992 | Miyata | 358/449 |
| 5,157,521 | * 10/1992 | Chung | 358/496 |
| 5,222,157 | * 6/1993 | Yoneda et al. | 358/403 |
| 5,255,311 | 10/1993 | Yoshida | 379/100 |
| 5,257,064 | * 10/1993 | Okamoto | 355/318 |
| 5,257,114 | 10/1993 | Yoshida et al. | 358/448 |
| 5,289,290 | * 2/1994 | Suzuki et al. | 358/440 |
| 5,408,340 | * 4/1995 | Edamura | 358/468 |
| 5,410,419 | * 4/1995 | Muramatsu et al. | 358/468 |
| 5,412,485 | * 5/1995 | Kashiwagi | 358/441 |
| 5,499,101 | * 3/1996 | Watanabe | 358/406 |
| 5,550,614 | * 8/1996 | Motoyama | 358/296 |
| 5,815,289 | * 9/1998 | Yoshida | 358/468 |

\* cited by examiner

*Primary Examiner*—Cheukfan Lee
(74) *Attorney, Agent, or Firm*—Fitzpatrick, Cella, Harper & Scinto

(57) ABSTRACT

An image communication apparatus such as a facsimile apparatus comprises a reading circuit to read images of both of the front and back sides of an original to be transmitted, a discriminating circuit to discriminate the presence or absence of the image of the side of the original which was read by the reading circuit, and a transmitting circuit for transmitting the image of the side excluding the side of the original without the image on the basis of the result of the judgment of the discriminating circuit.

16 Claims, 21 Drawing Sheets

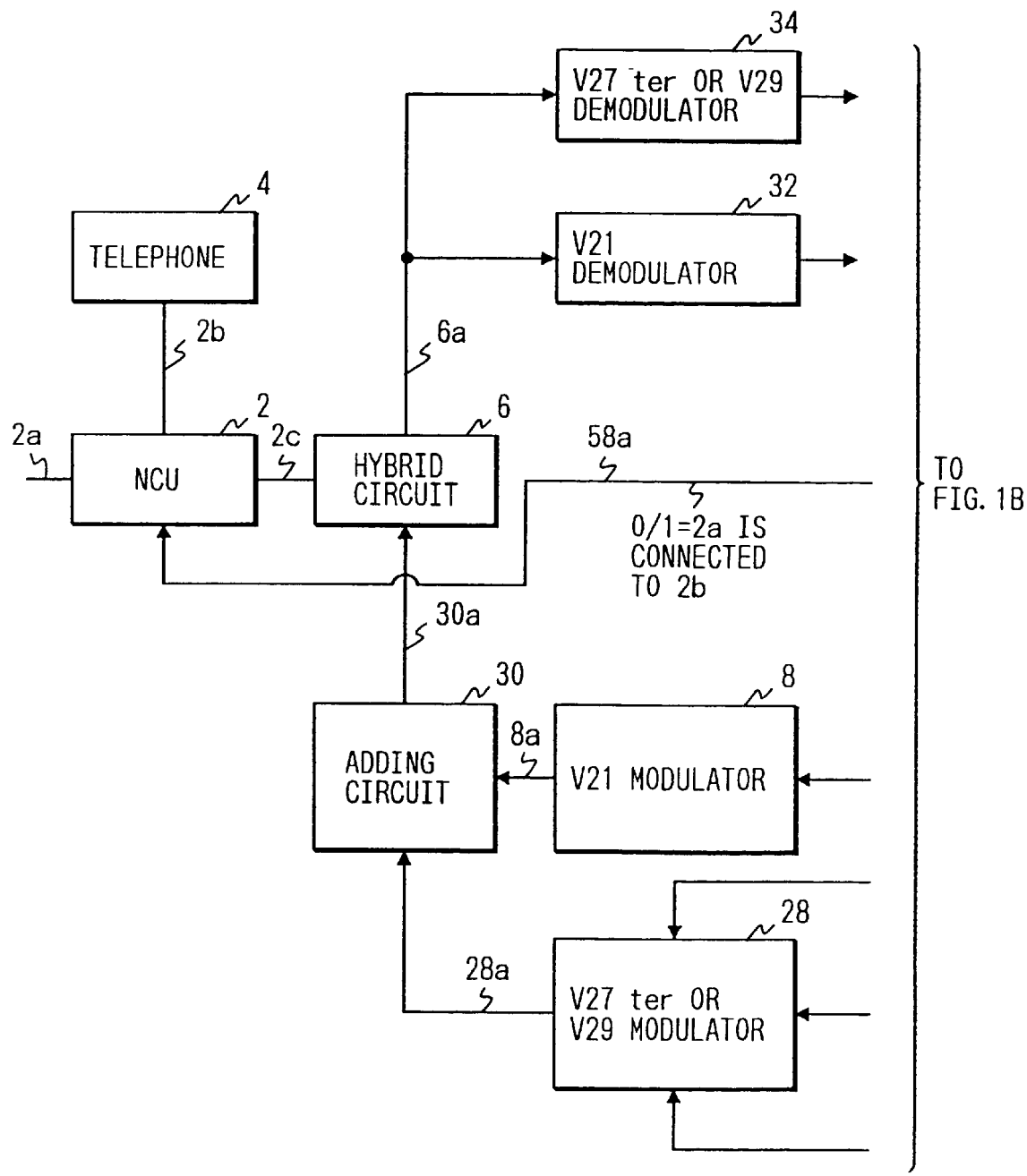

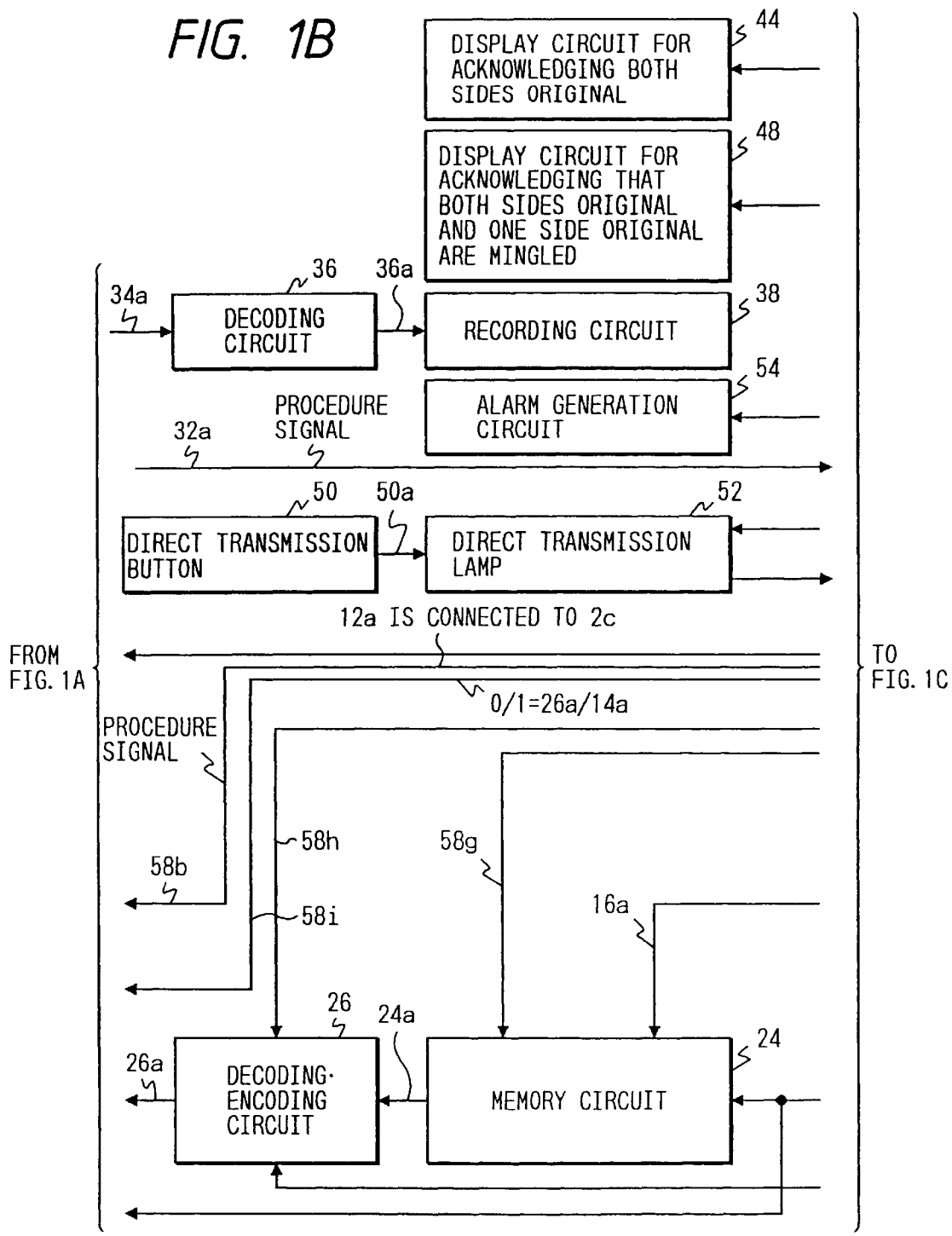

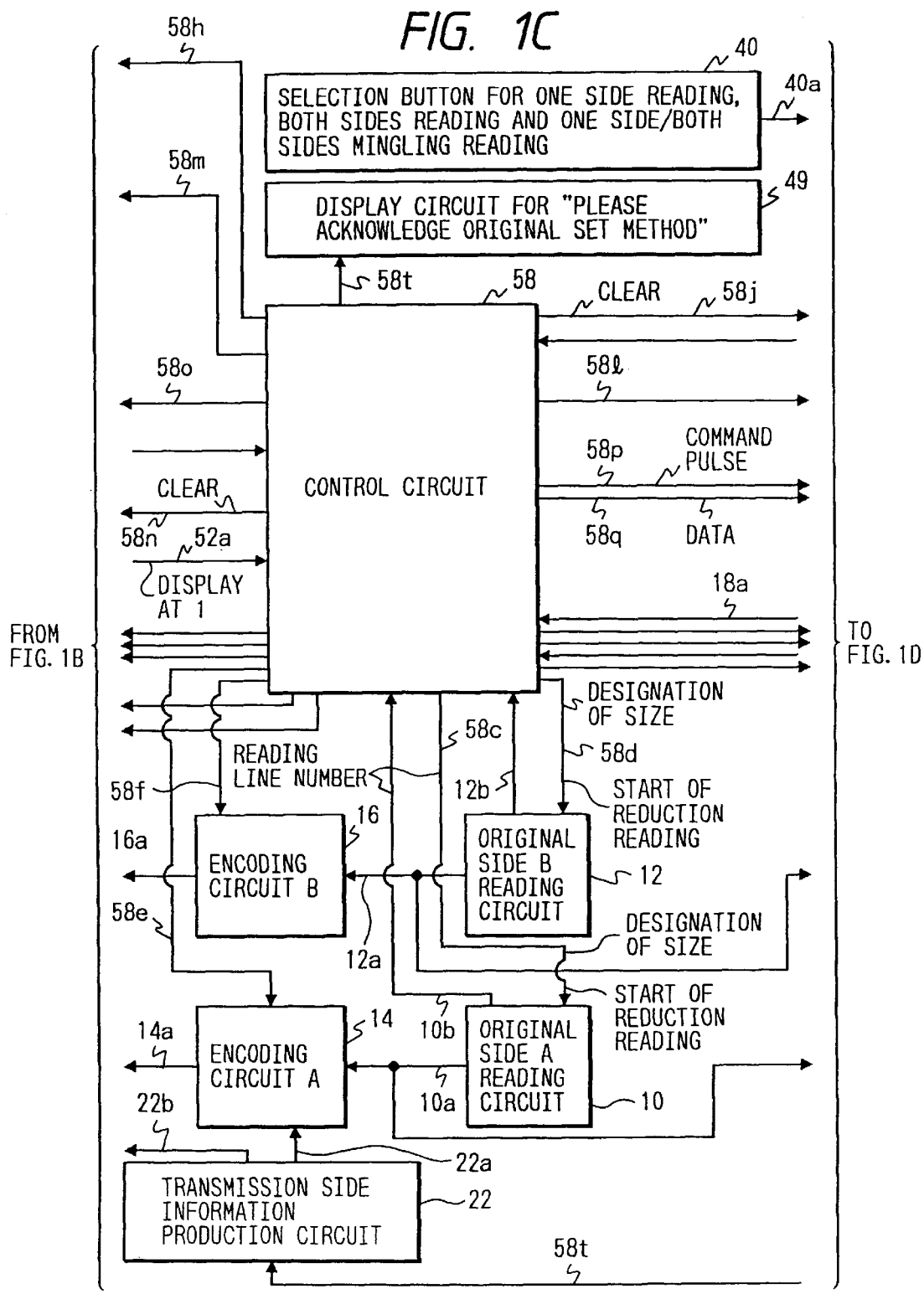

FIG. 1D
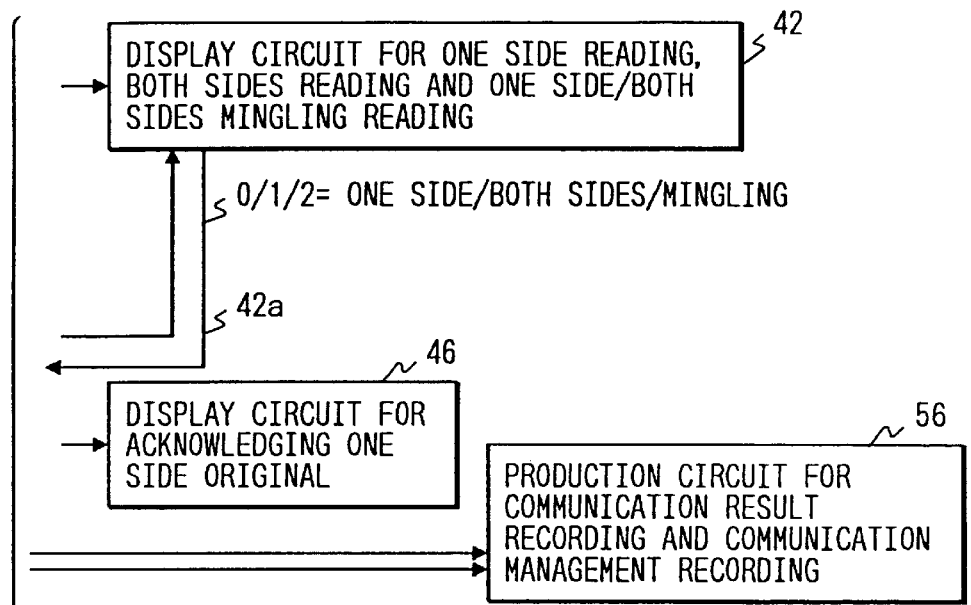
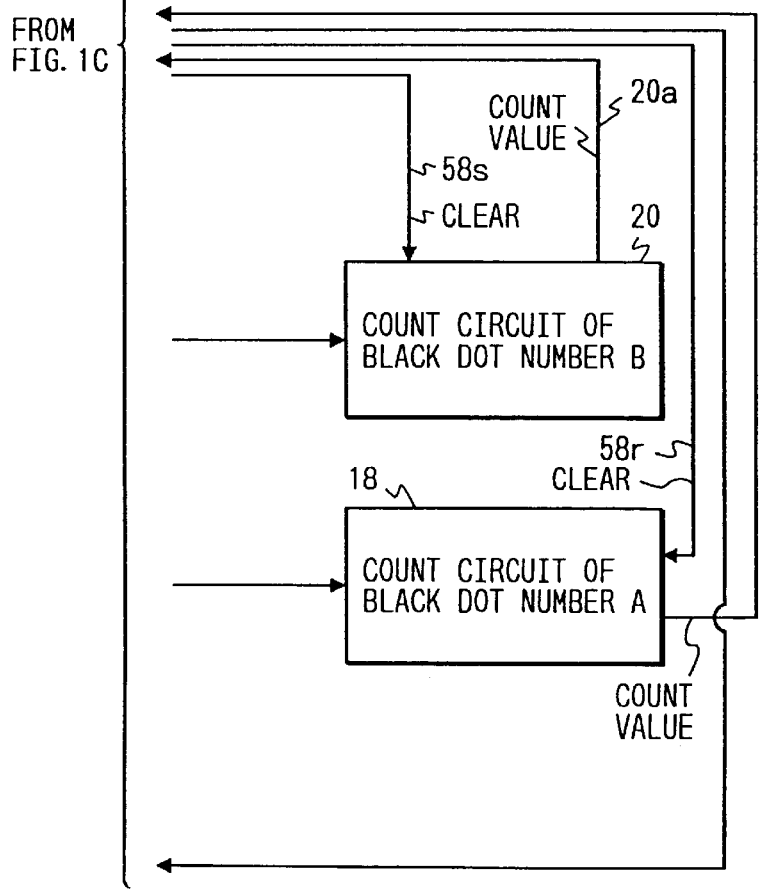

| FIG. 4A |
| FIG. 4B |

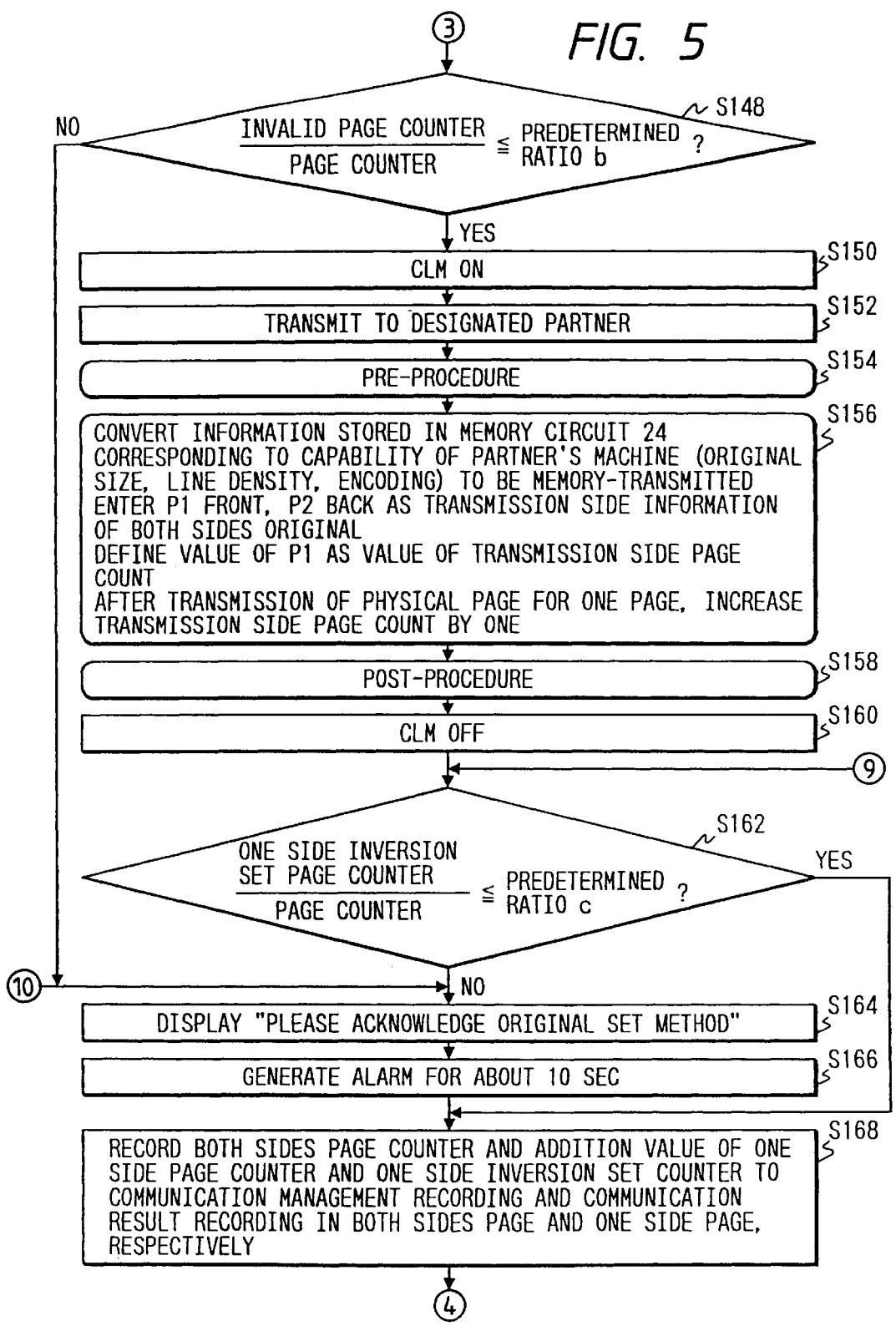

FIG. 16

```
COMMUNICATION MANAGEMENT REPORT

TRANSMISSION TO FOLLOWING PARTNER IS COMPLETED.

COMMUNICATION NO.        0014

PARTNER'S TELEPHONE NO.  03 3455 9000

PARTNER'S ABBREVIATION   ○□△ HANBAI

START DATE               91. 7. 3    09 : 53

COMMUNICATION TIME       10' 25

PAGE                     12  (BOTH SIDES : 4,
                              ONE SIDE   : 8)
                                    101
```

FIG. 17

COMMUNICATION MANAGEMENT REPORT

| COMMUNICATION MODE | PARTNER'S TELEPHONE NO. | PARTNER'S ABBREVIATION | START DATE | COMMUNICATION TIME | PAGE | COMMUNICATION RESULT |
|---|---|---|---|---|---|---|
| AUTOMATIC RECEPTION | 03 3455 9000 | ○□△ HANBAI | '91. 10. 3 | 7' 10 | 18 | OK |
| TRANSMISSION | 045 312 1991 | ○□△ TORIDE | '91. 10. 3 | 21' 50 | BOTH SIDES : 18<br>ONE SIDE : 0 | OK |
| TRANSMISSION | 03 3123 2222 | ○□△ MITA | '91. 10. 3 | 12' 35 | BOTH SIDES : 3<br>ONE SIDE : 2 | OK |

102

FACSIMILE APPARATUS

This application is a continuation of Application Ser. No. 08/183,397 filed Jan. 19, 1994, now abandoned.

BACKGROUND OF THE INVENTION

1. Field of the Invention

The invention relates to a facsimile apparatus and, more particularly, to a facsimile apparatus which can read and transmit information on both sides of an original to be read.

2. Related Background Art

A conventional facsimile apparatus reads information of only one side of an original and transmits it. A facsimile apparatus which reads information of both sides of an original and transmit the read information does not exist.

In case of an original such that information has been printed on both sides, the operations for reading the information of one side and for transmitting must be executed twice and, after that, the read information of both sides must be transmitted. In this case, there is a drawback such that the transmitting operations of two times are needed and the read information is not sequentially transmitted in accordance with the order of the pages.

SUMMARY OF THE INVENTION

It is an object of the invention to solve the above problem and to provide a facsimile apparatus which can certainly read and transmit information of both sides of an original to be read in accordance with the proper order without dropping out any page.

The above and other objects and features of the present invention will become apparent from the following detailed description and the appended claims with reference to the accompanying drawings.

BRIEF DESCRIPTION OF THE DRAWINGS

FIG. 1 is comprised of FIGS. 1A to 1D showing block diagrams of a facsimile apparatus of an embodiment according to the present invention;

FIG. 5 is a flowchart showing a control procedure of the control circuit in FIGS. 1A to 1D;

FIG. 16 is a diagram showing a recording example of a communication result recording and a communication management recording; and FIG. 17 is a diagram showing a recording example of a communication result recording and a communication management recording.

DETAILED DESCRIPTION OF THE PREFERRED EMBODIMENT

Figure 2:
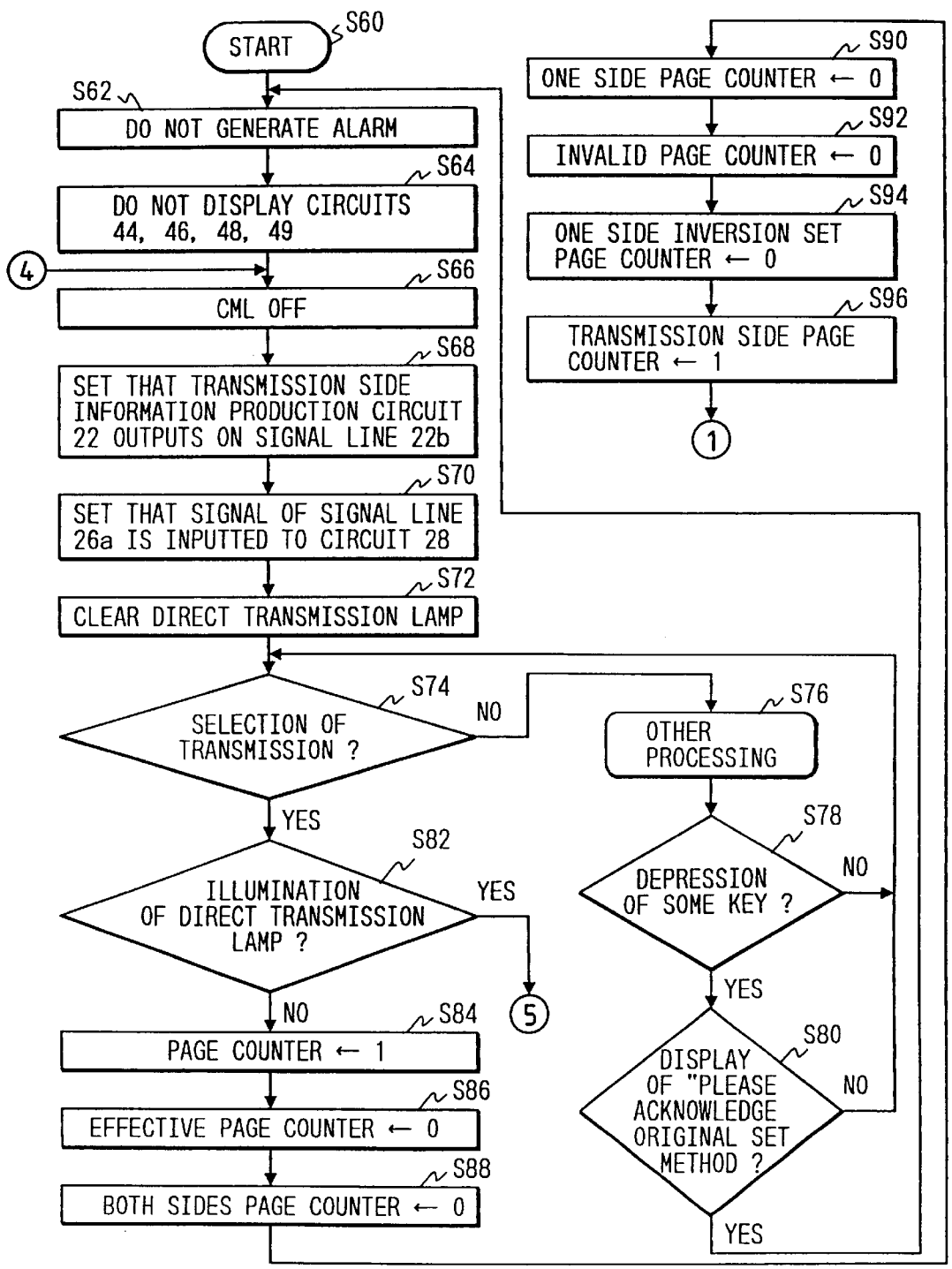
FIG. 2 is a flowchart showing a control procedure of a control circuit in FIGS. 1A to 1D.

The present invention will be described in detail hereinbelow with respect to an embodiment shown in the drawings.

FIGS. 1A to 1D show block constructional diagrams of a facsimile apparatus to which the invention is applied. In FIGS. 1A to 1D, reference numeral 2 denotes an NCU (Network Control Unit). In order to use a telephone network for a data communication or the like, the NCU 2 is connected to a terminal of a line of the telephone network, thereby executing a connection control of the telephone exchange network, a switching to a data communication path, and a holding of a loop.

A signal line 2a indicates a telephone line. The NCU 2 receives a signal on a signal line 58a. When the level of such a signal is equal to "0", the NCU 2 connects the telephone line to the telephone side, namely, connects the signal line 2a to a signal line 2b. The NCU 2 inputs the signal on the signal line 58a. When the signal level is equal to "1", the NCU 2 connects the telephone line to the facsimile apparatus side, namely, connects the signal line 2a to a signal line 2c. In the ordinary state, the telephone line is connected to the telephone 4 side.

Reference numeral 6 denotes a hybrid circuit for separating the signal of the transmitting system and the signal of the receiving system. Namely, a transmission signal on a signal line 30a passes through the signal line 2c and is sent to the telephone line via the NCU 2. A signal sent from the partner side, on the other hand, passes through the NCU 2 and, after that, it passes through the signal line 2c and is sent to a signal line 6a.

Reference numeral 8 denotes a modulator for executing the modulation based on the well-known CCITT recommendation V21. The modulator 8 receives a procedure signal on a signal line 58b and modulates and outputs the modulated data to a signal line 8a.

Reference numeral 10 denotes a reading circuit of an original side A (namely, front side of the original). The reading circuit 10 sequentially reads the image signal of one line in the main scan direction of the original side A from the transmission original in response to an instruction of a reading size, an instruction indicative of the presense or absence of the reduction, an instruction of a reduction ratio in case of the reduction, and an instruction of the start of reading or the like which are output to a signal line 58c, thereby forming a signal train indicative of a binary value of black and white. When the start to read one page is selected by the signal line 58c, the number of lines to be read and the number of lines after completion of the reduction when the reducing mode is selected are output to a signal line 10b. A signal sequence which is constructed by an image pickup device such as a CCD (charge coupled device) or the like and an optical system and was binarized by black and white is output to a signal line 10a.

Reference numeral 12 denotes a reading circuit of an original side B (namely, back side of the original). The reading circuit 12 sequentially reads image signals of one line in the main scan direction of the original side B from the transmitted original in response to an instruction of the reading size, an instruction regarding the presence or absence of the reduction, an instruction of a reduction ratio, and an instruction to start the reading or the like which are output to a signal line 58*d*, thereby forming a signal sequence indicative of a binary value of black and white. When the start to read one page is selected by the signal line 58*d*, the number of lines to be read and the number of lines after completion of the reduction in the case where the reduction was selected are output to the signal line 10*b*. A signal sequence which is constructed by an image pickup device such as a CCD (charge coupled device) or the like and an optical system and was binarized by black and white is output to a signal line 12*a*.

The reading circuits 10 and 12 can be constructed by, for example, providing reading circuits similar to the conventional reading circuits on both sides (front and back sides) of a conveying path of the original. Even in the case where a reading circuit similar to the conventional reading circuit is provided for only one side of the conveying path of the original, it can be used as reading circuits 10 and 12. In this case, however, for example, it is sufficient to provide an original feeding mechanism which can reverse the front and back sides of an original and can (again) convey the original to the reading position.

Reference numeral 14 denotes an encoding circuit for adding the read data which was output to the signal line 10*a* and the transmission side information which was output to a signal line 22*a* and inputting the resultant added data and sending to a signal line 14*a* the data which was encoded (MH (Modified Huffman) encoding or MR (Modified Read) encoding) by an encoding method which was designated on a signal line 58*e*.

Reference numeral 16 denotes an encoding circuit for inputting the read data which was output to the signal line 12*a* and outputting to a signal line 16*a* the data which was encoded (MH (Modified Huffman) encoding or MR (Modified Read) encoding) by an encoding method which was designated on a signal line 58*f*.

Reference numeral 18 denotes a count circuit for counting the number of black dots on the original side A. The count circuit 18 is used to detect the presence or absence of the image information on the reading side of the original. When a clear pulse is generated on a signal line 58*r*, the count circuit 18 counts the number of black dots which are output to the signal line 10*a* and supplies the count value to a signal line 18*a*.

It should be noted that the number of black dots of only the read information is counted and the number of black dots which are included in the transmission side information (such as page number or the like which is transmitted together with the image information of the original) is not counted. This is because if the number of black dots included in the transmission side information is also counted, the number of black dots is certainly set to predetermined dots in one transmission information.

Reference numeral 20 denotes a count circuit for counting the number of black dots of the original B. When a clear pulse is generated on a signal line 58*s*, the count circuit 20 counts the number of black dots which are output to the signal line 12*a* and supplies the count value to a signal line 20*a*. In a manner similar to the count circuit 18, the number of black dots of only the read information is counted and the number of black dots included in the transmission side information is not counted because of the above reason.

Reference numeral 22 denotes a transmission side information production circuit for designating the size of transmission side information by a signal line 58*t* and for designating whether information is output to the signal line 22*a* or 22*b* and for outputting information to the signal line 22*a* or 22*b* as dot pattern information when there is an output instruction after that.

Reference numeral 24 denotes a memory circuit 24 for storing the information which was output to the signal line 14*a* or the information which was output to the signal line 16*a* under control of a signal line 58*g*. The data stored in the memory circuit 24 is output to a signal line 24*a* under control of the signal line 58*g*.

Reference numeral 26 denotes a decoding/encoding circuit for inputting the signal on the signal line 24*a*, for converting the signal on the basis of a conversion instruction (conversion instruction regarding the size, mode, encoding method, and the like) which has once been decoded and output to a signal line 58*h*, for again encoding the data and outputting to a signal line 26*a*, and for outputting to the signal line 26*a* the data in which a dot pattern which had been output to the signal line 22*b* was encoded in addition to such encoded data.

Reference numeral 28 denotes a modulator for performing a modulation based on the well-known CCITT recommendation V27ter (differential phase modulation) or V29 (orthogonal modulation). The modulator 28 receives a signal on a signal line 58*i* and inputs the signal on the signal line 26*a* when the signal line 58*i* is set to the signal level "0" or inputs the signal on the signal line 14*a* when the signal line 58*i* is set to the signal level "1" and modulates the input signal and outputs the modulated data to a signal line 28*a*.

Reference numeral 30 denotes an adding circuit for receiving the signals on the signal lines 8*a* and 28*a* and outputting the result of the addition to the signal line 30*a*.

Reference numeral 32 denotes a demodulator for performing a demodulation based on the well-known CCITT recommendation V21. The demodulator 32 receives the signal on the signal line 6*a* and executes the V21 demodulation and supplies the demodulated data to a signal line 32*a*.

Reference numeral 34 denotes a demodulator for performing a demodulation based on the well-known CCITT recommendation V27ter (differential phase modulation) or V29 (orthogonal modulation). The demodulator 34 receives the signal on the signal line 6*a* and executes the demodulation and supplies the demodulated data to a signal line 34*a*.

Reference numeral 36 denotes a decoding circuit for receiving a signal on the signal line 34*a* and outputs to a signal line 36*a* the data which was decoded (MH (Modified Huffman) decoding or MR (Modified Read) decoding).

Reference numeral 38 denotes a recording circuit for inputting the signal which was output to the signal line 36*a* and sequentially recording every line. The recording circuit 38 can be constructed by a recording mechanism of an arbitrary recording method.

Reference numeral 40 denotes a selection button for selecting either one of the transmitting modes such as one side reading mode, both sides reading mode, and one side/both sides reading mingling reading mode. When the selection button 40 is depressed, a pulse is generated on a signal line 40*a*.

Reference numeral 42 denotes a display circuit. When a clear pulse is generated on a signal line 58*j*, the display circuit 42 displays "ONE SIDE READING" and, after that, each time a pulse is generated on the signal line 40a, the display circuit 42 repetitively displays "BOTH SIDES READING", "ONE SIDE/BOTH SIDES MINGLING READING", and "ONE SIDE READING". When "ONE SIDE READING" is displayed, the signal of "0" is output to a signal line 42a. When "BOTH SIDES READING" is displayed, the signal of "1" is output to the signal line 42a. When "ONE SIDE/BOTH SIDES MINGLING READING" is displayed, the signal of "2" is output to the signal line 42a.

Reference numeral 44 denotes a display circuit. When the signal of the signal level "1" is output to a signal line 58k, the display circuit 44 displays "PLEASE ACKNOWLEDGE BOTH SIDES ORIGINAL". The display circuit 44 displays nothing when the signal of the signal level "0" is output to the signal line 58k.

When the signal of the signal level "1" is output to a signal line 58t, a display circuit 46 displays "PLEASE ACKNOWLEDGE ONE SIDE ORIGINAL". The display circuit 46 displays nothing when the signal of the signal level "0" is output to the signal line 58l.

When the signal of the signal level "1" is output to a signal line 58m, a display circuit 48 displays "PLEASE ACKNOWLEDGE SINCE BOTH SIDES AND ONE SIDE ORIGINALS ARE MINGLED". The display circuit 48 displays nothing when the signal of the signal level "0" is output to the signal line 58m.

When the signal of the signal level "1" is output to the signal line 58t, a display circuit 49 displays "PLEASE ACKNOWLEDGE ORIGINAL SET METHOD". When the signal of the signal level "0" is output to the signal line 58t, the display circuit 49 displays nothing.

Reference numeral 50 denotes a direct transmission button which is used for directly transmitting the read information of the original without storing the original information into a memory. When the button 50 is depressed, a pulse is generated on a signal line 50a.

Reference numeral 52 denotes a direct transmission lamp which is lit off when a clear pulse is generated on a signal line 58n. After that, each time a pulse is generated on the signal line 50a, the "light on"→"light off"→"light on" of the lamp 52 are repeated. When the direct transmission lamp 52 is lit off, the signal of the signal level "0" is output to a signal line 52a. When the lamp 52 is lit on, the signal of the signal level "1" is output to the signal line 52a.

Reference numeral 54 denotes an alarm generating circuit for generating an alarm when the signal of the signal level "1" is generated on a signal line 58o. When the signal of the signal level "0" is output to the signal line 58o, the circuit 54 generates no alarm.

Reference numeral 56 denotes a circuit for producing a communication result recording and a communication management recording. After the data for the communication result recording and communication management recording was output to a signal line 58q, when a recording command pulse is generated on a signal line 58p, the communication result recording and the communication management recording which were sent to the signal line 58q are recorded.

Reference numeral 58 denotes a control circuit. In a facsimile apparatus which can read information on both sides of an original, the control circuit 58 controls in a manner such that in the memory transmitting mode, the information printed on both sides of the original is transmitted, the information printed on one side (one of the back side and the front side) is transmitted, and the information which is not printed on both sides is not transmitted. In the direct transmitting mode, the information printed on both sides is transmitted and the information printed on only the front surface is transmitted. When the side of a one side original has been set in the reverse state, "PLEASE ACKNOWLEDGE ORIGINAL SET METHOD" is displayed. As for the transmission side information when the both sides original is transmitted, the information of "BACK" is transmitted after the page number in case of the back page. As a communication result recording and a communication management recording, information indicating the number pages of the both sides original which were transmitted and information indicative of the number of pages of the one side original which were transmitted are recorded. The control circuit 58 mainly executes the control as mentioned above.

FIGS. 2 to 9 show original reading control procedures for the control circuit in FIGS. 1A to 1D. In the example of FIGS. 2 to 9, those flowcharts show the case where there is the selection button of "one side reading", "both sides reading", and "one side/both sides mingling reading" or where there is no display and the machine automatically judges all of those reading modes. It is assumed that the position shown by the same alphabet in each flowchart continues at that position.

In FIG. 2, in step S62, the signal of the signal level "0" is output to the signal line 58o, thereby preventing that an alarm is generated.

In step S64, the signal of the signal level "0" is output to the signal lines 58k, 58l, 58m, and 58t, thereby inhibiting the display of the display circuits 44, 46, 48, and 49. That is, the display of "PLEASE ACKNOWLEDGE BOTH SIDES ORIGINAL" (display circuit 44) is lit off. The display of "PLEASE ACKNOWLEDGE ONE SIDE ORIGINAL" (display circuit 46) is lit off. The display of "PLEASE ACKNOWLEDGE SINCE BOTH SIDES AND ONE SIDE ORIGINAL ARE MINGLED" (display circuit 48) is lit off. The display of "PLEASE ACKNOWLEDGE ORIGINAL SET METHOD" (display circuit 49) is lit off.

In step S66, the signal of the signal level "0" is output to the signal line 58a, a CML relay of the NCU 2 is turned off, and the telephone line 2a is connected to the telephone 4 side.

In step S68, the transmission side information production circuit 22 is output (transmitted) to the signal line 22b through the signal line 58t.

In step S70, the signal of the signal level "0" is output to the signal line 58i and the V27ter or V29 modulator inputs the signal on the signal line 26a, namely, the output of the decoding/encoding circuit 26.

In step S72, a clear pulse is generated on the signal line 58n and the direct transmission lamp 52 is lit off.

In step S74, a check is made to see if the transmission has been selected or not. When the transmission is selected, step S82 follows. When the transmission is not selected, step S76 follows and another process is executed.

In step S78, a check is made to see if some key has been depressed or not. If YES, step S80 follows. When no key is depressed, step S74 follows.

In step S80, a check is made to see if a message of "PLEASE ACKNOWLEDGE ORIGINAL SET METHOD" has been displayed by the display circuit 49 or not. If YES, step S62 follows. If NO, step S74 follows.

In step S82, a check is made to see if the signal on the signal line 52a had been input and the direct transmission lamp 52 has been lit on or not. If YES, step S170 follows. If NO, step S84 follows.

In step S84, "1" is set into a page counter for counting the number of originals set on an original supporting plate in order to transmit.

In step S86, "0" is set into an effective page counter for counting the number of no printing pages in which nothing is printed on both sides.

In step S88, "0" is set into a both sides page counter for counting the number of printing pages in which information has been printed on both sides.

In step S90, "0" is set into a one side page counter for counting the number of pages in which information has been printed on the front side of an original and nothing is printed on the back side.

In step S92, "0" is set into an invalid page counter for counting the number of pages in which nothing is printed on both sides.

In step S94, "0" is set into a one side inversion set page counter for counting the number of pages in which information has been printed on back side of an original and nothing is printed on the front side.

In step S96, "1" is set into a transmission side page counter for counting the number of transmission side pages which is added to the transmission side information.

Figure 3:
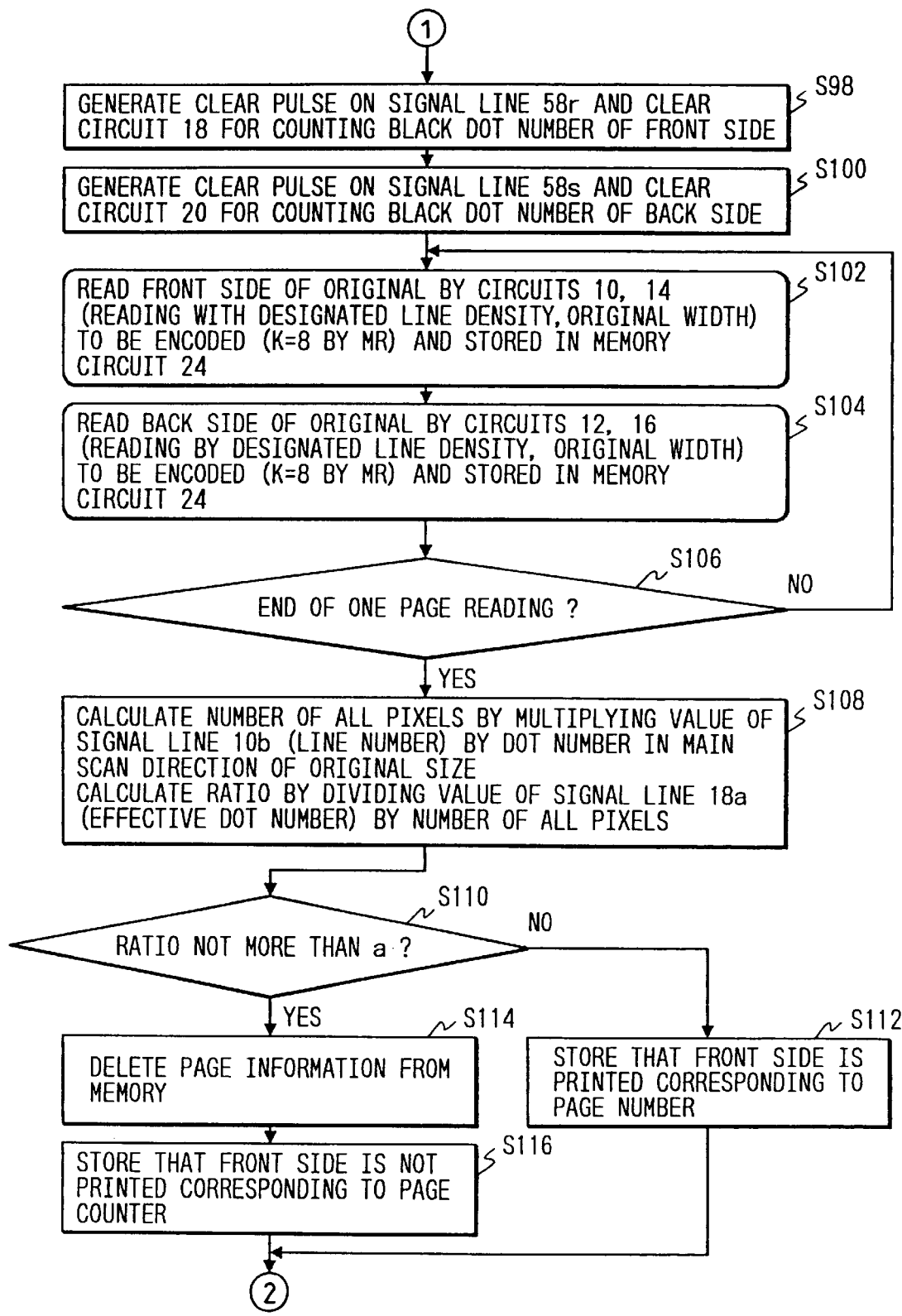
FIG. 3 is a flowchart showing a control procedure of the control circuit in FIGS. 1A to 1D.

In step S98 in FIG. 3, a clear pulse is generated to the signal line 58r, thereby clearing the black dot number A count circuit 18 for counting the number of black dots on the front side of the original.

In step S100, a clear pulse is generated to the signal line 58s and the black dot number B count circuit 20 for counting the number of black dots on the back side of the original is cleared.

In step S102, the information on the front side of the original is read (the designated line density and original width (equal magnification) are read) and is encoded (MR encoding system: K=8) through the original side A reading circuit 10 and encoding circuit A 14 and the encoded data is stored into the memory circuit 24.

In step S104, the information on the back side of the original is read (the designated line density and original width (equal magnification) are read) and is encoded (MR encoding system: K=8) through the reading circuit 12 and encoding circuit 16 and the encoded data is stored into the memory circuit 24.

In step S106, a check is made to see if the reading of the information of one page has been finished or not. If YES, step S108 follows. If NO, step S102 follows.

In step S108, the number of all pixels is obtained by multiplying the number of dots in the main scan direction of the original size to the value (the number of lines) of the signal line 10b. By dividing the number of black dots (the number of effective dots) of the signal line 18a by the number of all pixels, its ratio is obtained.

In step S110, a check is made to see if the ratio obtained in step S108 is equal to or less than (a) or not. If YES, step S114 follows and the page information is deleted from the memory circuit 24 by the control of the signal line 58g. In step S116, information indicating that nothing is printed on the front side is stored in correspondence to the page counter. When the ratio is larger than (a) in step S110, step S112 follows and information indicating that data has been printed on the front side is stored in correspondence to the page counter.

Figures 4, 4A:
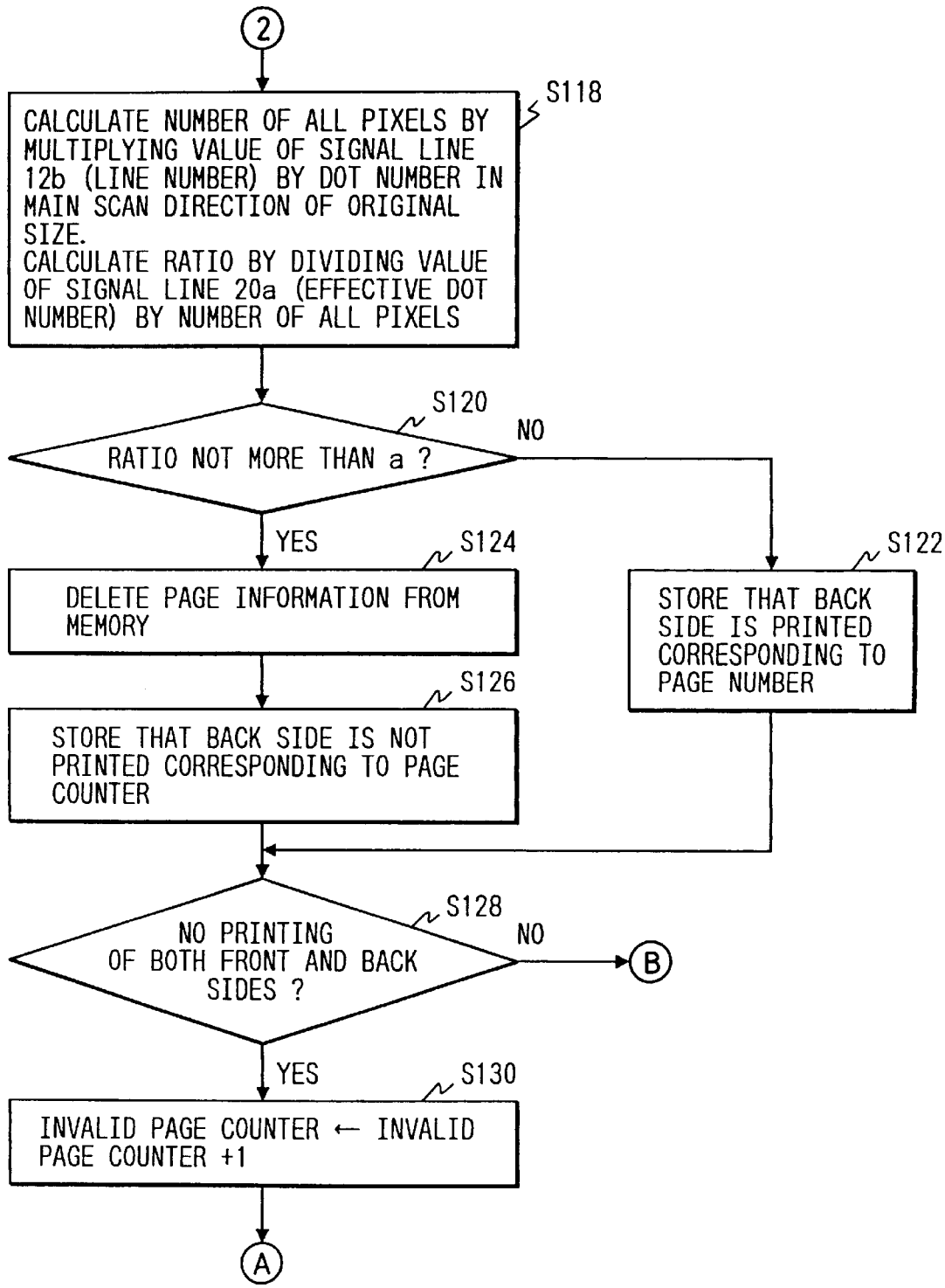
FIG. 4 is comprised of FIGS. 4A and 4B illustrating flowcharts showing a control procedure of the control circuit in FIGS. 1A to 1D.
Figure 4B:
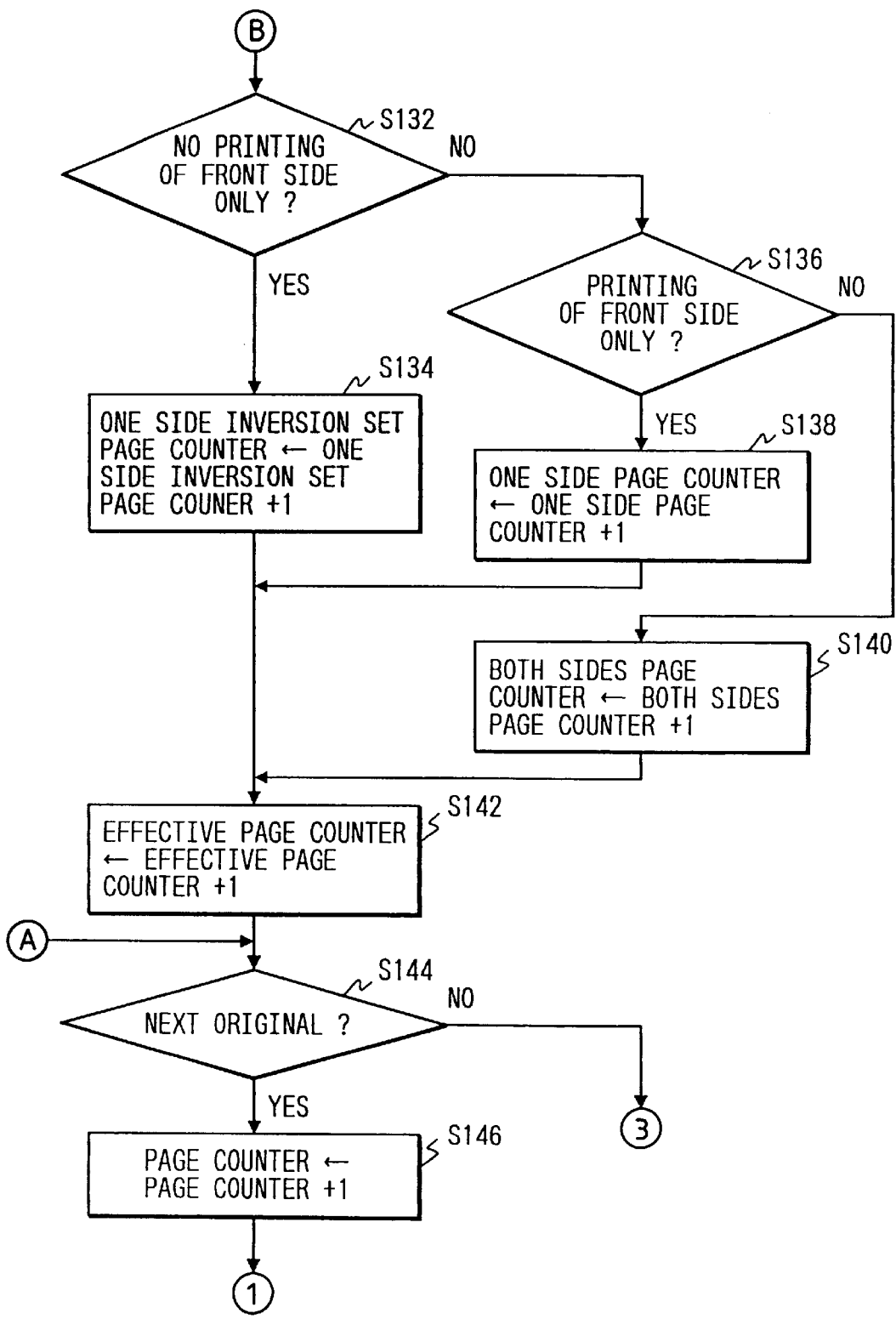

In step S118 in FIGS. 4A and 4B, the number of all pixels is obtained by multiplying the number of dots in the main scan direction of the original size to the value (the number of lines) of the signal line 12b. By dividing the number of black dots (the number of effective dots) of the signal line 20a, its ratio is obtained.

In step S120, a check is made to see if the ratio obtained in step S118 is equal to or less than (a) or not. If YES, step S124 follows and the page information is deleted from the memory circuit 24 by the control of the signal line 58g. In step S126, information indicating that nothing is printed on the front side is stored in correspondence to the page counter. In step S120, when the ratio is larger than (a), step S122 follows and information indicating that data has been printed on the front side is stored in correspondence to the page counter.

In step S128, a check is made to see if nothing is printed on both of the front and back sides or not. If YES, step S130 follows and the count value of the invalid page counter is increased by "1". When data has been printed on both of the front and back sides, step S132 follows.

In step S132, a check is made to see if nothing is printed on only the front side (data has been printed on the back side) or not. If YES, step S134 follows and the count value of the one side inversion page counter is increased by "1". If NO, step S136 follows.

In step S136, a check is made to see if data has been printed on only the front side (nothing is printed on the back side) or not. If YES, step S138 follows and the count value of the one side page counter is increased by "1". If NO, this means that data has been printed on both of the front and back sides, so that step S140 follows and the count value of the both sides page counter is increased by "1".

In step S142, the count value of the effective page counter is increased by "1".

In step S144, a check is made to see if there is a next page or not. If YES, step S146 follows and the count value of the page counter is increased by "1". If NO, step S148 follows.

In step S148 in FIG. 5, the count value of the invalid page counter is divided by the count value of the page counter, thereby discriminating whether its ratio is equal to or less than a predetermined ratio (b) or not. When the ratio is equal to or less than (b), step S150 follows. When the ratio is larger than (b), step S164 follows.

In step S150, the signal of the signal level "1" is output to the signal line 58a, the CML relay of the NCU 2 is turned on, and the line is connected to the facsimile apparatus side.

In step S152, a call is generated to the designated partner's machine.

In step S154, the facsimile communication pre-procedure is indicated.

In step S156, the information stored in the memory circuit 24, namely, the communication conditions such as original size, line density, encoding method, and the like are converted in accordance with the capability of the partner's machine under control of the signal lines 58g and 58h and the memory transmission is executed.

The count value of the page counter of the transmission side information is set into the count value of the transmission side page counter. The transmission side information of the both sides original is written as P1 front and P1 back. After the physical page of one page was transmitted, the transmission side page counter is increased by "1".

In step S158, a facsimile communication post-procedure is shown.

In step S160, the signal of the signal level "0" is output to the signal line 58a, the CML relay of the NCU 2 is turned off, and the line is connected to the telephone 4 side.

In step S162, the count value of the one side inversion set page counter is divided by the count value of the page counter, thereby discriminating whether its ratio is equal to or less than a predetermined ratio (c) or not. When the ratio is larger than (c), step S164 follows. When the ratio is equal to or less than (c), step S168 follows.

In step S164, the signal of the signal level "1" is output to the signal line 58$t$ and "PLEASE ACKNOWLEDGE ORIGINAL SET METHOD" is displayed by the display circuit 49.

In step S166, the signal of the signal level "1" is output to the signal line 58$o$ for ten seconds and an alarm is generated for 10 seconds.

In step S168, the count value of the both sides page counter and the value (the count value of the one side page counter and the count value of the one side inversion set page counter were added) are respectively recorded as both sides page and one side page into the communication management recording and the communication result recording. Actually, after the data was output to the signal line 58$g$, a recording command pulse is output to the signal line 58$p$.

Figure 6:
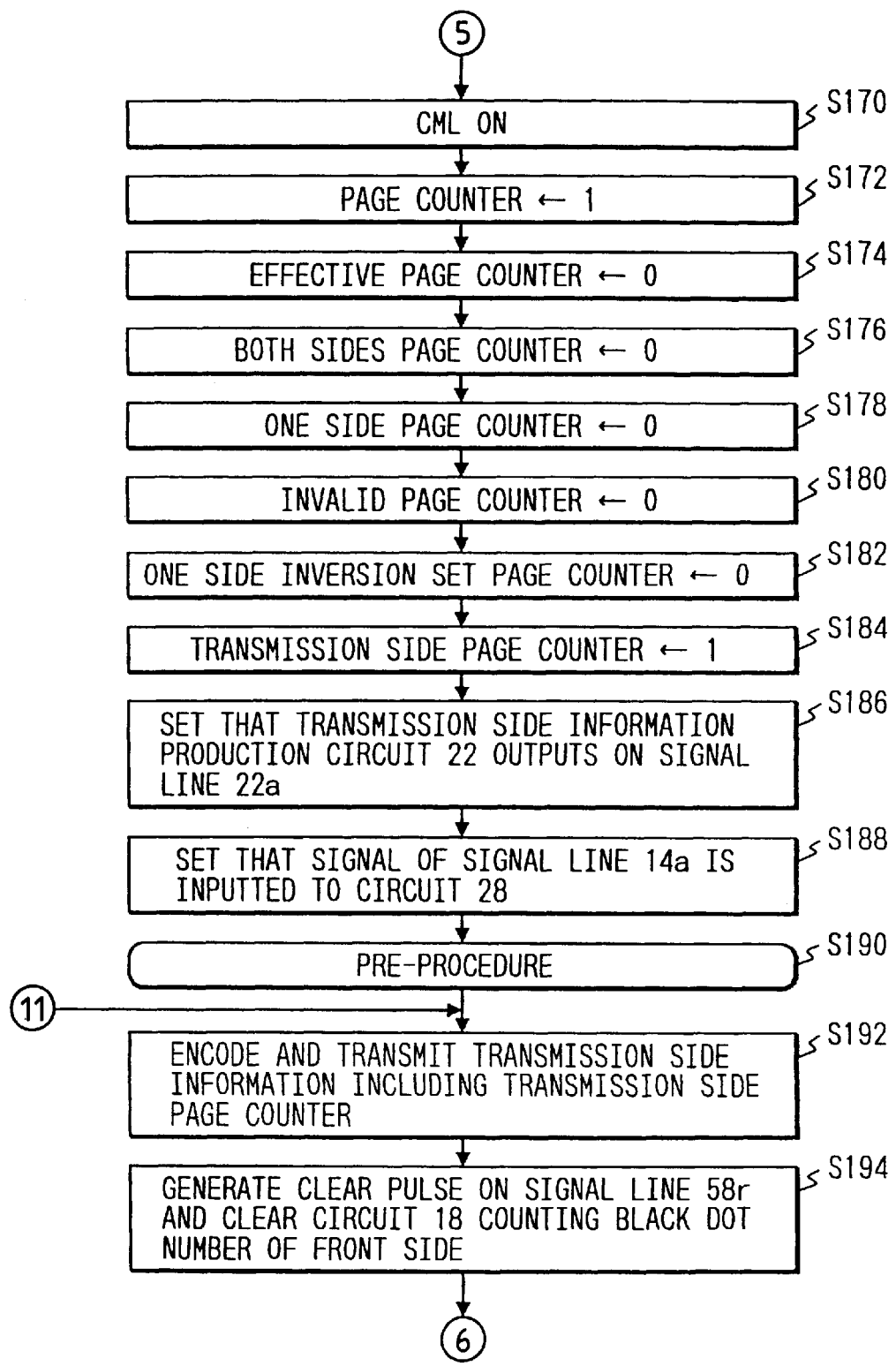
FIG. 6 is a flowchart showing a control procedure of the control circuit in FIGS. 1A to 1D.

In step S170 in FIG. 6, the signal of the signal level "1" is output to the signal line 58$a$, the CML relay of the NCU 2 is turned on, and the line is connected to the facsimile apparatus side.

In step S172, "1" is set into the page counter for counting the number of papers set on the original supporting plate to be transmitted.

In step S174, "0" is set into the effective page counter for counting the number of pages (data has been printed on only the front side) and pages (data has been printed on both of the front and back sides).

In step S176, "0" is set into the both sides page counter for counting the number of pages (data has been printed on both of the front and back sides).

In step S178, "0" is set into the one side page counter for counting the number of pages (data has been printed on the front side of the original and nothing is printed on the back side).

In step S180, "0" is set into the invalid page counter for counting the number of pages (nothing is printed on both of the front and back sides).

In step S182, "0" is set into the one side inversion set page counter for counting the number of pages (data has been printed on the back side of the original and nothing is printed on the front side).

In step S184, "1" is set into the transmission side page counter for counting the number of transmission side pages which is added to the transmission side information.

In step S186, the transmission side information production circuit 22 outputs the transmission side information to the signal line 22$a$ through the signal line 58$t$.

In step S188, the signal of the signal level "1" is output to the signal line 58$i$ and the V27ter or V29 modulator is set so as to input the signal on the signal line 14$a$, namely, the output of the encoding circuit A.

Step S190 shows a facsimile communication pre-procedure.

In step S192, the transmission side information including the count value of the transmission side page counter is encoded and transmitted by the control of the signal line 58$t$.

In step S194, a clear pulse is generated to the signal line 58$r$, thereby clearing the black dot number A count circuit 18 for counting the number of black dots of the front side of the original.

Figure 7:
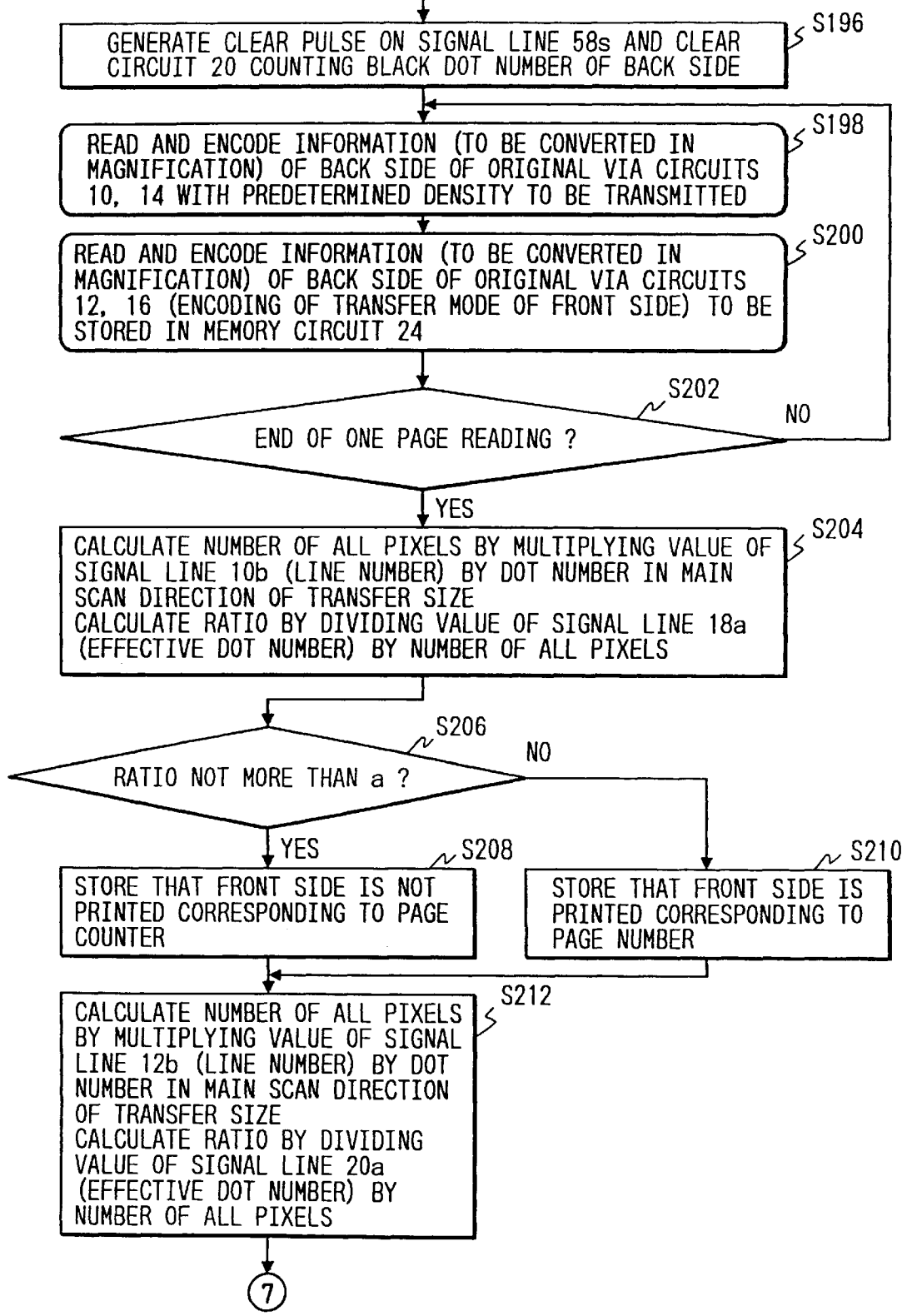
FIG. 7 is a flowchart showing a control procedure of the control circuit in FIGS. 1A to 1D.

In step S196 in FIG. 7, a clear pulse is generated to the signal line 58$s$, thereby clearing the black dot number B count circuit 20 for counting the number of black dots of the back side of the original.

In step S198, the information on the front side of the original (information which was magnification converted) is read with a predetermined line density by the original side A reading circuit 10 and is encoded by the encoding circuit A 14 and the encoded information is transmitted.

In step S200, the information on the back side of the original (information which was magnification converted) is read with a predetermined line density and encoded (encoded in the transmitting mode of the front side) through the reading circuit 12 and the encoding circuit 16 and the encoded information is stored into the memory circuit 24.

In step S202, a check is made to see if the reading operation of one page has been finished or not. If YES, step S204 follows. If NO, step S198 follows.

In step S204, the number of all pixels is obtained by multiplying the number of dots in the main scan direction of the transmission size to the value (the number of lines) of the signal line 10$b$. By dividing the value (the number of effective dots) of the signal line 18$a$ by the number of all pixels, its ratio is obtained.

In step S206, a check is made to see if the ratio obtained in step S204 is equal to or less than (a) or not. If YES, step S208 follows. When the ratio is larger than (a), step S210 follows.

In step S208, information indicating that nothing is printed on the front side is stored in correspondence to the page counter.

In step S210, information indicating that data has been printed is stored in correspondence to the page counter.

In step S212, the number of all pixels is obtained by multiplying the number of dots in the main scan direction of the transmission size to the value (the number of lines) of the signal line 12$b$. By dividing the value (the number of effective dots) of the signal line 20$a$ by the number of all pixels, its ratio is obtained.

Figure 8:
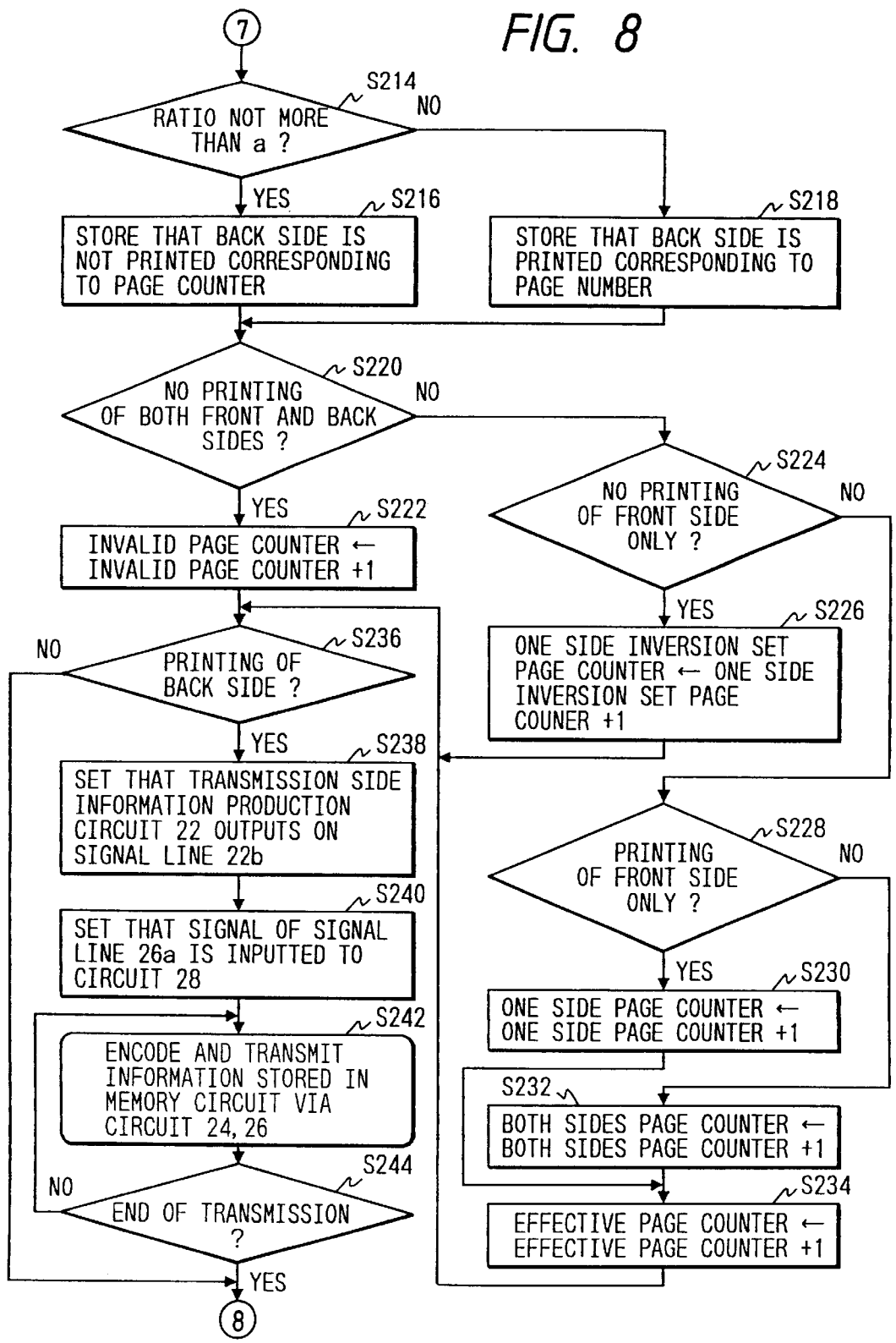
FIG. 8 is a flowchart showing a control procedure of the control circuit in FIGS. 1A to 1D.

In step S214 in FIG. 8, a check is made to see if the ratio obtained in step S212 is equal to or less than (a) or not. If YES, step S216 follows and information indicating that nothing is printed on the back side is stored in correspondence to the count value of the page counter. When the ratio is larger than (a), step S218 follows and information indicating that data has been printed on the back side is stored in correspondence to the page counter.

In step S220, a check is made to see if nothing is printed on both of the front and back sides or not. If YES, step S222 follows and the count value of the invalid page counter is increased by "1". If NO, step S224 follows.

In step S224, a check is made to see if nothing is printed on only the front side (data has been printed on the back side) or not. If YES, step S226 follows and the count value of the one side inversion set page counter is increased by "1". If NO, step S228 follows.

In step S228, a check is made to see if data has been printed on only the front side (nothing is printed on the back side) or not. If YES, step S230 follows and the count value of the one side page counter is increased by "1". If NO, since this means that data has been printed on both of the front and back sides, step S232 follows and the count value of the both sides page counter is increased by "1".

In step S234, the count value of the effective page counter is increased by "1".

In step S236, a check is made to see if data has been printed on the back side or not. If YES, step S238 follows. If NO, step S246 in FIG. 9 follows.

In step S238, the transmission side information production circuit 22 is set so as to output the transmission side information to the signal line 22b through the signal line 58t. Characters of "back" are added after the count value of the transmission side page counter.

In step S240, the signal of the signal level "0" is output to the signal line 58i and the V27ter or V29 modulator 28 is set so as to input the signal on the signal line 26a.

In step S242, the signal lines 58g and 58h are controlled and the information stored in the memory circuit is encoded and transmitted through the memory circuit 24 and decoding/encoding circuit 26.

In step S244, a check is made to see if the transmission has been finished or not. If NO, step S242 follows. If YES, step S246 follows.

Figure 9:
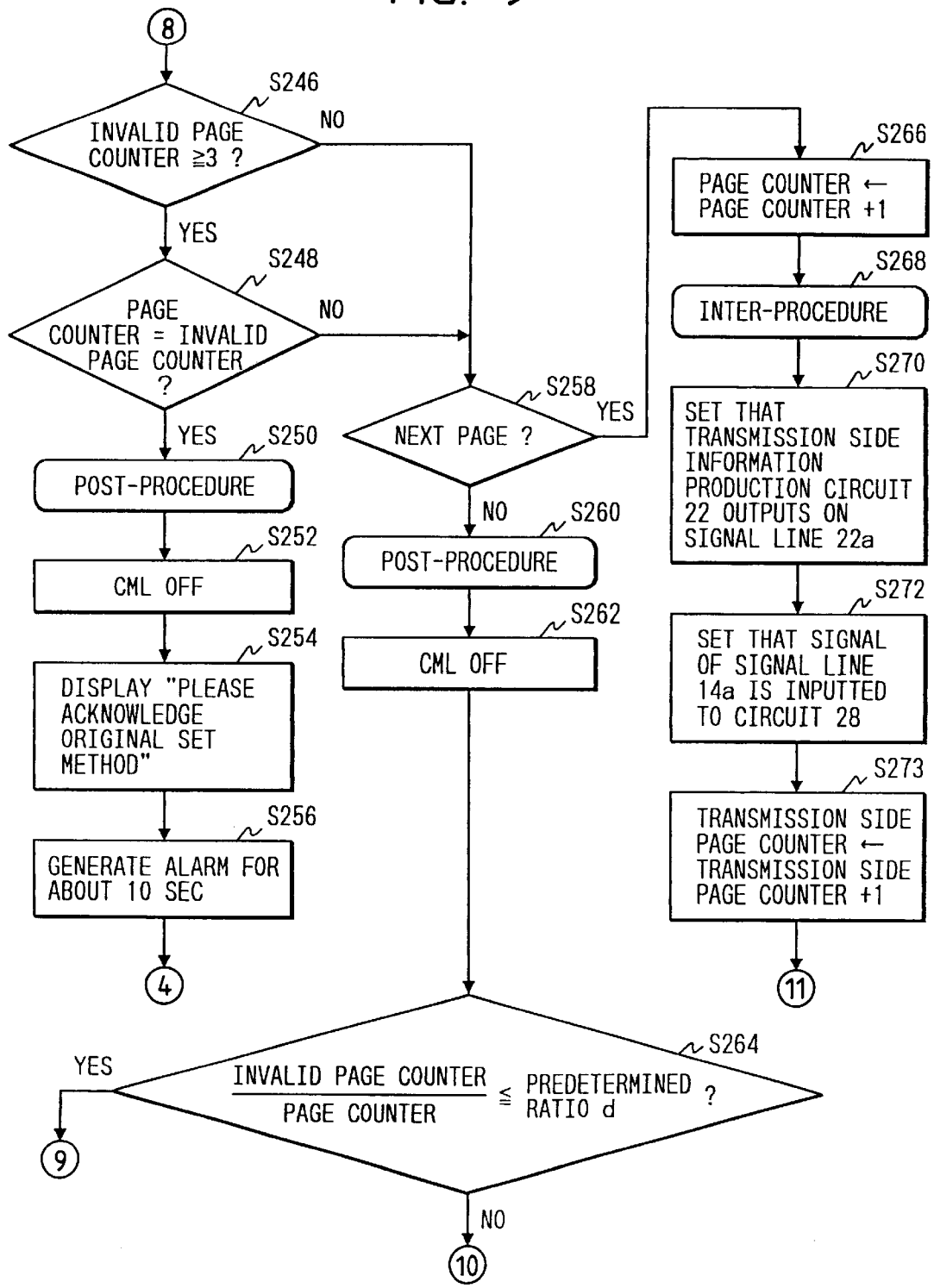
FIG. 9 is a flowchart showing a control procedure of the control circuit in FIGS. 1A to 1D.

In step S246 in FIG. 9, a check is made to see if the count value of the invalid page counter is equal to or larger than 3 or not. If YES, step S248 follows. If NO, step S258 follows.

In step S248, a check is made to see if the count value of the page counter is equal to the count value of the invalid page counter or not. When they are equal, namely, when all of three pages are invalid pages, step S250 follows and a post-procedure is executed. If NO, step S258 follows.

In step S252, the signal of the signal level "0" is output to the signal line 58a, the CML relay of the NCU 2 is turned off, and the line is connected to the telephone side.

In step S254, the signal of the signal level "1" is output to the signal line 58t and "PLEASE ACKNOWLEDGE ORIGINAL SET METHOD" is displayed.

In step S256, the signal of the signal level "1" is output to the signal line 58o for 10 seconds and alarm is generated for 10 seconds.

In step S258, a check is made to see if there is a next page or not. If YES, step S266 follows and the count value of the page counter is increased by "1". If NO, step S260 follows and a post-procedure is executed.

In step S262, the signal of the signal level "0" is output to the signal line 58a, the CML relay is turned off, and the line is connected to the telephone side.

In step S264, a check is made to see if the value which is obtained by dividing the count value of the invalid page counter by the count value of the page counter is equal to or less than a predetermined ratio (d) or not. If YES, step S162 follows. If NO, step S164 follows.

Step S268 shows an inter-procedure.

In step S270, the transmission side information production circuit 22 is set so as to output the transmission side information to the signal line 22a by the control of the signal line 58t.

In step S272, the signal of the signal level "1" is output to the signal line 58i and the V27ter or V29 modulator 28 is set so as to input the signal on the signal line 14a.

In step S273, the count value of the transmission side page counter is increased by "1".

FIGS. 16 and 17 show a communication result report and a communication management report after completion of the communication according to the present invention. FIG. 16 shows the communication result report after completion of one communication. FIG. 17 shows the communication management report. In this case, the number of both sides pages and the number of one side pages are output as the numbers of communication pages as shown by reference numerals 101 and 102.

In the embodiment, the case where the memory transmission is performed with respect to the transmission of one location has been considered. However, it is also possible to consider the memory transmission for the multi-address transmission.

Upon memory transmission, the case where the page in which data has been printed on only the back side is also regarded as an effective page is also considered. In this case, however, it is also possible to consider that such a page is an invalid page.

Further, in the direct transmission, the case where when three pages in which nothing is printed on both of the front and back sides were transmitted from the first page, the transmission is interrupted has been considered. The transmission, however, can be also interrupted by another condition such that a predetermined number of pages in which data has been printed on only the back side were transmitted, or the like.

In the above embodiment, the operator is not aware of a difference among the both sides original, the one side original, and the mingling of the both sides original and one side original excluding that the front side of the original is set. Namely, the machine automatically judges such the difference. However, since there is a case where the operator wants to transmit only the side in which there is a both sides original, it is also possible to construct the machine in a manner such that it can select either one of the mode in which the operator reads both sides, the mode to read only one side, the mode to read either the both sides or one side in accordance with the original, and the like. The circuits 40, 42, 44, 46, and 48 are now made effective for the first time.

Specifically speaking, in the case where either one of the one side reading mode, the both sides reading mode, and the one side/both sides mingling reading mode can be selected and the memory transmission is executed when the one side reading mode is selected, only the front side of the original is read. When information has been printed also on the back side of the original, "PLEASE ACKNOWLEDGE BOTH SIDES ORIGINAL" is displayed and the memory transmission of only the front side of the original is executed.

In case of executing the memory transmission when the both sides reading mode is selected, both sides of the original are read and are memory-transmitted. However, when information has been printed on only one side of the original, "PLEASE ACKNOWLEDGE ONE SIDE ORIGINAL" is displayed. When both of the both sides original and the one side original are mingled, "PLEASE ACKNOWLEDGE SINCE BOTH SIDES AND ONE SIDE ORIGINAL ARE MINGLED" is displayed. In case of executing the memory transmission when the one side/both sides mingling reading mode is selected, the information of both sides is transmitted in case of the information printed on both sides, while the information of one side is transmitted in case of the information printed on one side.

On the other hand, when the one side reading mode is selected upon direct transmission, only the front side of the original is read. When information has been printed also on the back side of the original, "PLEASE ACKNOWLEDGE BOTH SIDES ORIGINAL" is displayed and the direct transmission of only the front side of the original is executed. When the both sides reading mode is selected upon direct transmission, the front side of the original is transmitted and the back side is subsequently direct transmitted. However, when information has been printed on only one sides of all of the originals, "PLEASE ACKNOWLEDGE ONE SIDE ORIGINAL" is displayed. When the both sides original and the one side original are mingled, "PLEASE ACKNOWLEDGE SINCE BOTH SIDES ORIGINAL AND ONE SIDE ORIGINAL ARE MINGLED" is displayed.

Upon direct transmission, when the one side/both sides mingling reading mode is selected, the information on the front side is transmitted. In the case where data has also been printed on the back side, the data of the back side is transmitted. When nothing is printed on the back side, the data of only the front side is transmitted.

A specific example of the above control is shown in FIGS. 10 to 15 as modified portions of FIGS. 2 to 9. The same portions as those shown in FIG. 2 are designated by the same blocks with the step numbers in FIG. 2.

Figure 10:
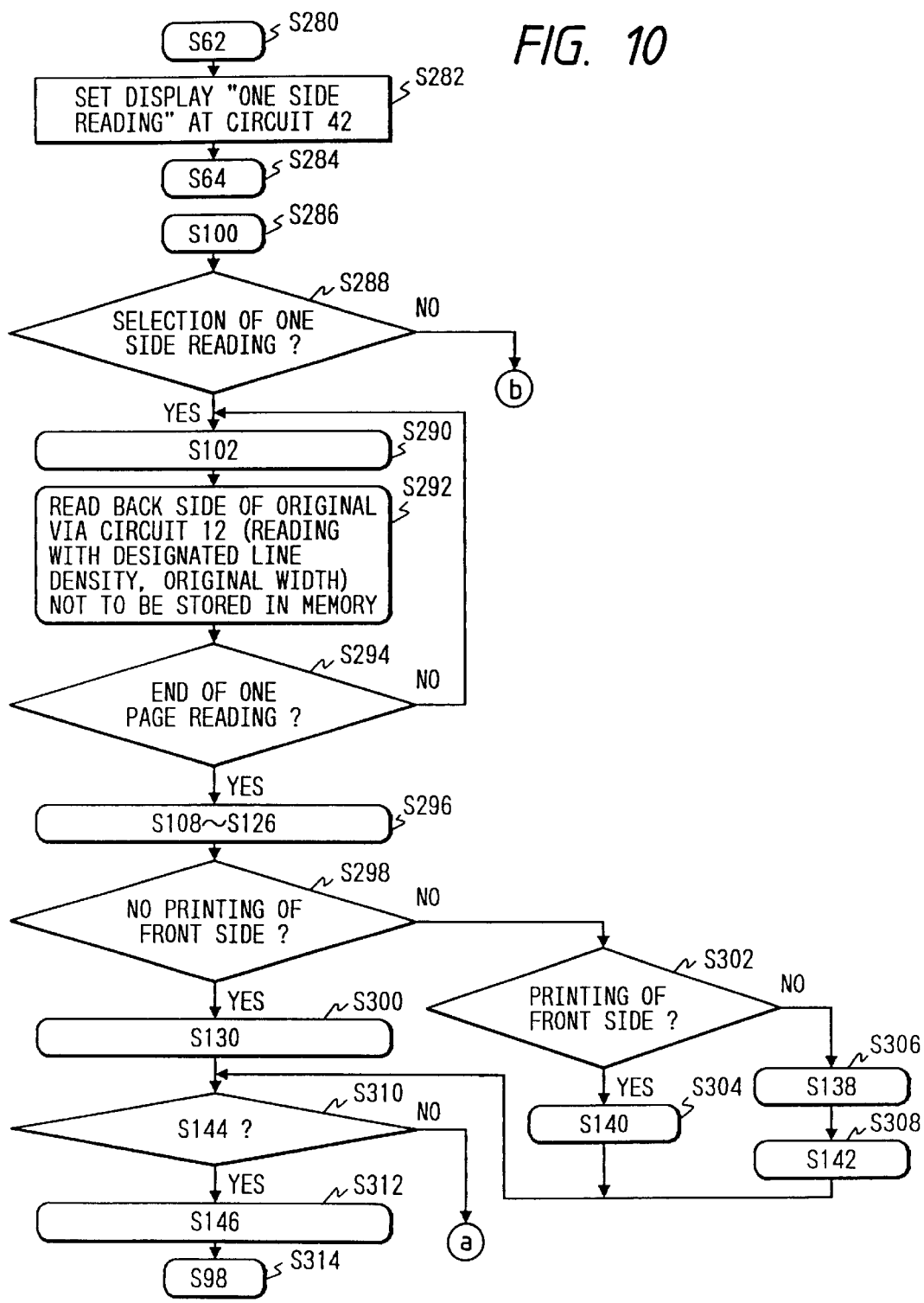
FIG. 10 is a flowchart showing a control procedure of the control circuit in FIGS. 1A to 1D.

A step S282 of generating a clear pulse to the signal line 58j and allowing the display circuit 42 to display "ONE SIDE READING" is added between steps S62 and S64 in FIG. 2 (from step S280 to step S284 in FIG. 10).

Step S286 shows a lower portion in step S100 in FIG. 3.

In step S288, a check is made to see if the signal on the signal line 42a has been inputted and the one side reading mode has been selected or not. If YES, step S290 follows. If NO, step S336 follows.

Step S290 shows a control similar to step S102 and information of the front side is stored into the memory circuit.

In step S292, the information of the back side of the original is read through the reading circuit 12 (with the designated line density and original width (equal magnification)) and is not stored into the memory.

In step S294, a check is made to see if the reading of one page has been finished or not. If YES, step S296 follows. If NO, step S290 follows.

Step S296 shows a control from step S108 to step S126 in FIG. 3.

In step S298, a check is made to see if nothing is printed on the front side of the original or not. If YES, step S300 follows and the count value of the invalid page counter is increased by "1". When data has been printed on the front side, step S302 follows.

In step S302, a check is made to see if data has been printed on the back side of the original or not. If YES, step S304 follows and the count value of the both sides page counter is increased by "1". When nothing is printed on the back side, step S306 follows and the count value of the one side page counter is increased by "1".

In step S308, the count value of the effective page counter is increased by "1".

In step S310, a check is made to see if there is a next original or not. If YES, step S312 follows and the count value of the page counter is increased by "1". When there is no next original, step S316 follows.

Step S314 corresponds to step S98 in FIG. 3.

Figure 11:
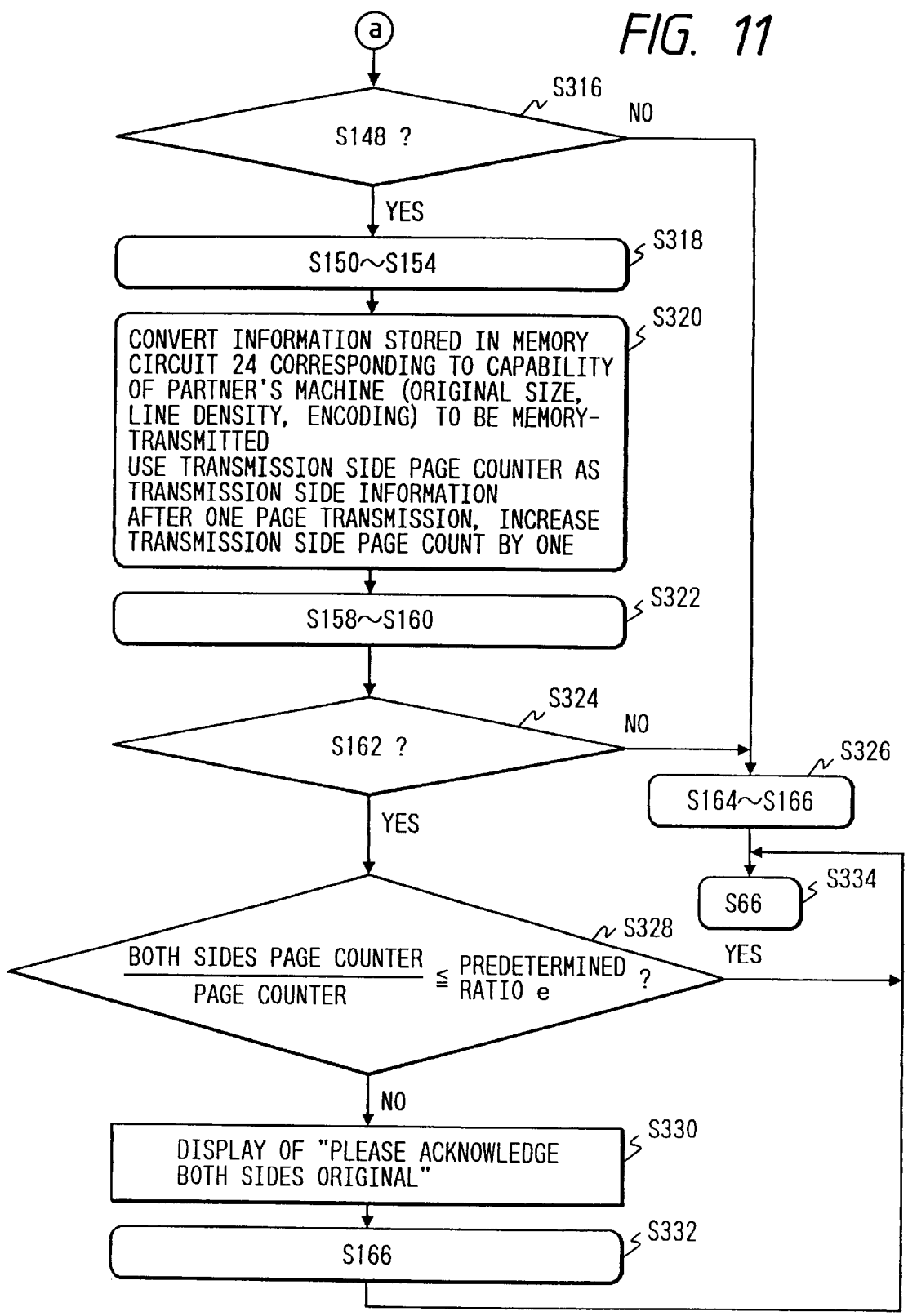
FIG. 11 is a flowchart showing a control procedure of the control circuit in FIGS. 1A to 1D.

In step S316 in FIG. 11, the count value of invalid page counter is divided by the count value of the page counter and a check is made to see if its ratio is equal to or less than a predetermined ratio (b) or not. When the ratio is equal to or less than (b), step S318 follows, the CML relay is turned on, the line is connected to the facsimile apparatus side, a call is generated to the designated partner's machine, and a pre-procedure is executed. When the ratio is larger than (b), step S326 follows.

In step S320, the information stored in the memory circuit 24 is converted, namely, the original size, line density, and encoding method are converted in accordance with the capability of the partner's machine by the control of the signal lines 58g and 58h. The converted information is memory transmitted. The transmission side page counter is used as transmission side information. After the information of one page was transmitted, the count value of the transmission side page counter is increased by "1".

In step S322, a post-procedure is executed, the CML relay is turned off, and the line is connected to the telephone side.

In step S324, the count value of the one side inversion set page counter is divided by the count value of the page counter and a check is made to see if its ratio is equal to or less than a predetermined ratio (c) or not. When the ratio is equal to or less than (c), step S328 follows. When the ratio is larger than (c), step S326 follows and the controls in steps S164 and S166 in FIG. 2 are executed.

In step S328, the count value of the both sides page counter is divided by the count value of the page counter and a check is made to see if its ratio is equal to or less than a predetermined ratio (e) or not. When it is equal to or less than (e), step S334 follows. When the ratio is larger than (e), step S330 follows.

In step S330, the signal of the signal level "1" is output to the signal line 58k and "PLEASE ACKNOWLEDGE BOTH SIDES ORIGINAL" is displayed.

In step S332, an alarm is generated for 10 seconds.

Step S334 shows step S66 in FIG. 2.

Figure 12:
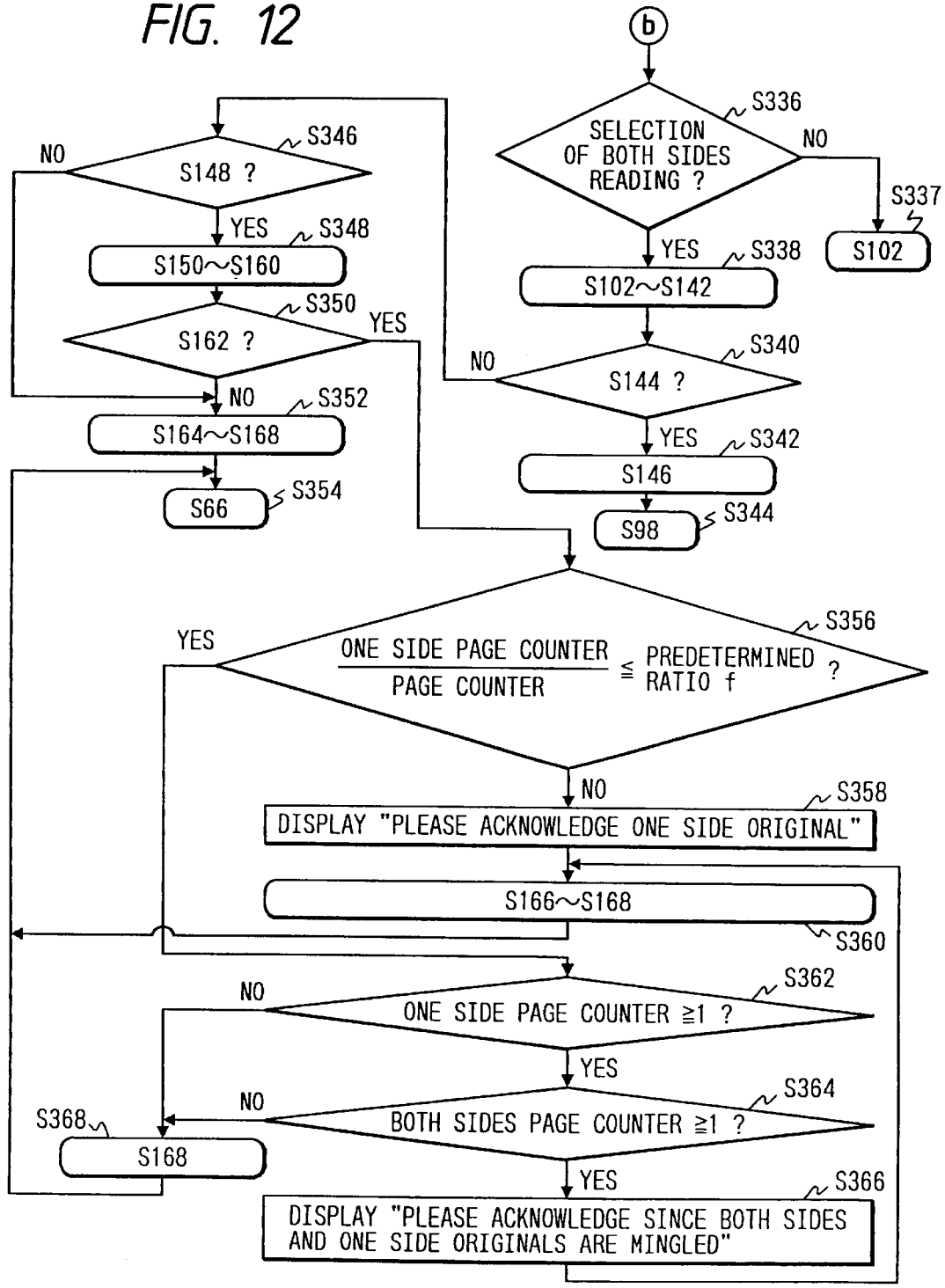
FIG. 12 is a flowchart showing a control procedure of the control circuit in FIGS. 1A to 1D.

In step S336 in FIG. 12, a check is made to see if the signal on the signal line 42a has been input and the both sides reading mode has been selected or not. If YES, step S338 follows. If NO, step S337 follows.

Step S337 shows step S102 in FIG. 3.

Step S338 shows processes in steps S102 to S142 in FIG. 3.

When there is the next original in step S340, step S342 follows, the count value of the page counter is increased by "1", and step S344 (step S98 in FIG. 3) follows. When there is a next original, step S346 follows.

In step S346, the count value of the invalid page counter is divided by the count value of the page counter. When its ratio is equal to or less than (b), step S348 follows. When the ratio is larger than (b), step S352 follows.

In step S348, the controls in steps S150 to S160 in FIG. 5 are executed and the memory transmission is performed.

In step S350, the count value of the one side inversion set page counter is divided by the count value of the page counter. When its ratio is equal to or less than (c), step S356 follows. When the ratio is larger than (c), step S352 follows.

In step S352, the controls in steps S164 to S168 in FIG. 5 are executed.

Step S354 shows that the processing routine advances to step S66 in FIG. 2.

In step S356, the count value of the one side page counter is divided by the count value of the page counter and a check is made to see if its ratio is equal to or less than a predetermined ratio (f) or not. If YES, step S362 follows. When the ratio is larger than (f), step S358 follows.

In step S358, the signal of the signal level of "1" is output to the signal line 58l and "PLEASE ACKNOWLEDGE ONE SIDE ORIGINAL" is displayed.

In step S360, the controls in steps S166 to S168 in FIG. 5 are executed.

In steps S362 and S364, when both of the count values of the one side page counter and both sides page counter are equal to or larger than 1, step S366 follows. When at least either one of them is equal to 0, step S368 follows.

In step S366, the signal of the signal level "1" is output to the signal line 58m and "PLEASE ACKNOWLEDGE SINCE BOTH SIDES AND ONE SIDE ORIGINALS ARE MINGLED" is displayed.

In step S368, the control in step S168 in FIG. 5 is executed.

Figure 13:
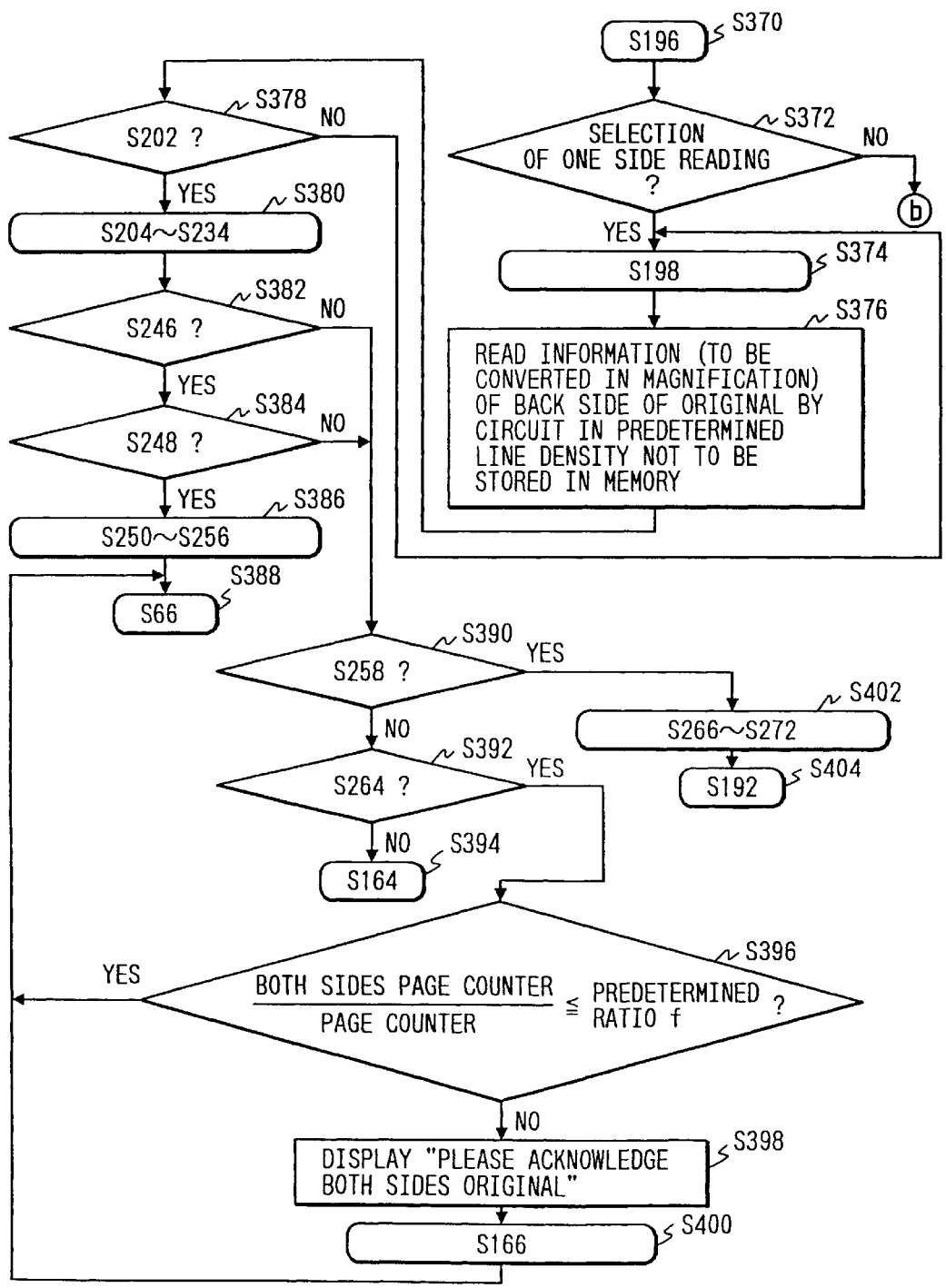
FIG. 13 is a flowchart showing a control procedure of the control circuit in FIGS. 1A to 1D.

Step S370 in FIG. 13 shows a modification of the lower portion of step S196 in FIG. 7.

In step S372, a check is made to see if the signal on the signal line 42a has been input and the one side reading mode has been selected or not. If YES, step S374 follows. If NO, step S406 in FIG. 14 follows.

Step S374 shows the transmission of the front side of the original by the same control as that in step S198 in FIG. 7.

In step S376, the information on the back side of the original (information which was magnification converted) is read with a predetermined line density by the reading circuit 12 and the read information is not stored into the memory.

In step S378, a check is made to see if the reading of one page has been finished or not. If YES, step S380 follows. If NO, step S374 follows.

Step S380 shows the controls in steps S204 to S234 in FIGS. 7 and 8.

In step S382, when the count value of the invalid page counter is equal to or larger than 3, step S384 follows. When it is less than 3, step S390 follows.

In step S384, a check is made to see if the count value of the page counter is equal to the count value of the invalid page counter or not. When they are equal, step S386 follows and the controls in steps S250 to S256 in FIG. 9 are executed. The processing routine advances to step S388 (step S66 in FIG. 2). When they are not equal, step S390 follows.

In step S390, when there is the next page, step S402 follows and the controls in steps S266 to S272 in FIG. 9 are executed and step S404 follows (step S192 in FIG. 6). When the next page does not exist, step S392 follows.

In step S392, the count value of the invalid page counter is divided by the count value of the page counter and a check is made to see if its ratio is equal to or less than a predetermined ratio (d) or not. If YES, step S396 follows. When the ratio is larger than (d), step S394 (step S164 in FIG. 5) follows.

In step S396, the count value of the both sides page counter is divided by the count value of the page counter and a check is made to see if its ratio is equal to or less than a predetermined ratio (e) or not. If YES, step S388 follows. When the ratio is larger than (e), step S398 follows.

In step S398, the signal of the signal level "1" is output to the signal line 58k and "PLEASE ACKNOWLEDGE BOTH SIDES ORIGINAL" is displayed.

In step S400, an alarm is generated for about 10 seconds.

Figure 14:
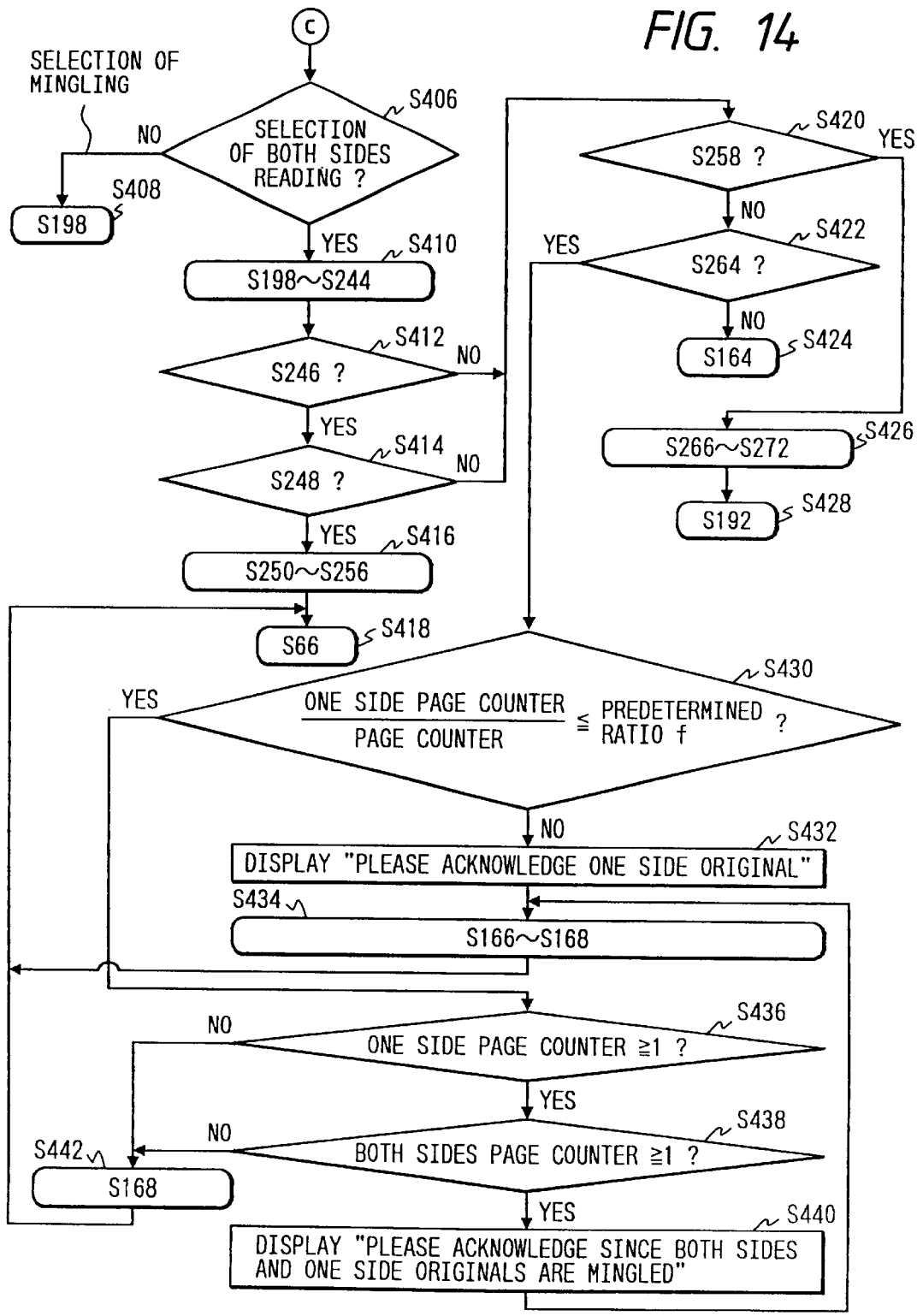
FIG. 14 is a flowchart showing a control procedure of the control circuit in FIGS. 1A to 1D.

In step S406 in FIG. 14, a check is made to see if the signal on the signal line 42a has been input and the both sides reading mode has been selected or not. If YES, step S410 follows. If NO, step S408 (step S198 in FIG. 7) follows.

In step S410, the controls in steps S198 to S244 in FIG. 7 are executed.

In step S412, a check is made to see if the count value of the invalid page counter is equal to or larger than 3 or not. If YES, step S414 follows. When it is less than 3, step S420 follows.

In step S414, a check is made to see if the count value of the page counter is equal to the count value of the invalid page counter or not. If YES, step S416 follows and the controls in steps S250 to S256 in FIG. 9 are executed and step S418 (step S66 in FIG. 2) follows. If NO, step S420 follows.

In step S420, when there is the next page, step S426 follows and the controls in steps S266 to S272 in FIG. 9 are executed and step S428 (step S192 in FIG. 6) follows. When there is no next page, step S422 follows.

In step S422, the count value of the invalid page counter is divided by the count value of the page counter and a check is made to see if its ratio is equal to or less than a predetermined ratio (d) or not. If YES, step S430 follows. When the ratio is larger than (d), step S424 (step S164 in FIG. 6) follows.

In step S430, the count value is divided by the count value of the page counter and a check is made to see if its ratio is equal to or less than a predetermined ratio (f) or not. If YES, step S436 follows. When it is larger than (f), step S432 follows.

In step S432, the signal of the signal level "1" is output to the signal line 58l and "PLEASE ACKNOWLEDGE ONE SIDE ORIGINAL" is displayed.

Step S434 shows the controls in steps S166 to S168 in FIG. 5.

In steps S436 and S438, when both of the count values of the one side page counter and both sides page counter are equal to or larger than 1, step S440 follows. When either one of the count values of the one side page counter and both sides page counter is equal to "0", step S442 follows and the control in step S168 in FIG. 5 is executed.

In step S440, the signal of the signal level "1" is output to the signal line 58m and "PLEASE ACKNOWLEDGE SINCE BOTH SIDES AND ONE SIDE ORIGINALS ARE MINGLED" is displayed.

Figure 15:
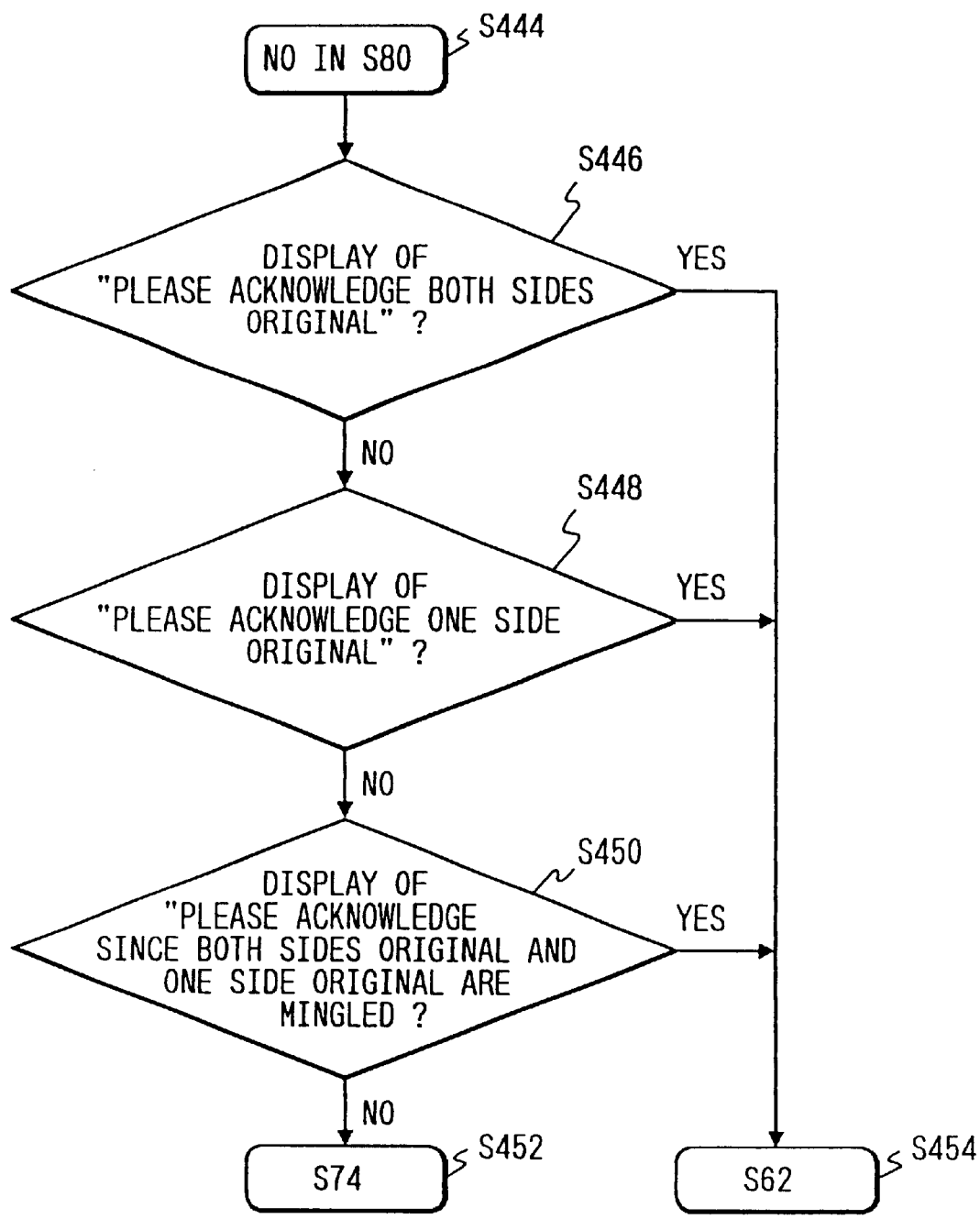
FIG. 15 is a flowchart showing a control procedure of the control circuit in FIGS. 1A to 1D.

Step S444 in FIG. 15 shows a process which is executed when the answer is NO in step S80 in FIG. 2.

In step S446, a check is made to see if "PLEASE ACKNOWLEDGE BOTH SIDES ORIGINAL" has been displayed or not. If YES, step S454 (step S62 in FIG. 2) follows. If NO, step S448 follows.

In step S448, a check is made to see if "PLEASE ACKNOWLEDGE ONE SIDE ORIGINAL" is displayed or not. If YES, step S454 follows. If NO, step S450 follows.

In step S450, a check is made to see if "PLEASE ACKNOWLEDGE SINCE BOTH SIDES AND ONE SIDE ORIGINALS ARE MINGLED" has been displayed or not. If YES, step S454 follows. If NO, step S452 (step S74 in FIG. 2) follows.

As mentioned above, the images of both sides/one side of the original can be certainly transmitted in accordance with the necessity. That is, either one of the one side transmitting mode of the original, theboth sides transmitting mode, and the one side/both sides mingling transmitting mode can be selected and the presence or absence of the image on the original is also discriminated. Therefore, the information printed on both sides can be also sequentially transmitted in accordance with the order of the front and back sides. Even in the case where the information printed on both sides and the information printed on one side are mingled, the information of both sides can be sequentially transmitted in accordance with the order of the front and back sides. In case of the information printed on one side, the information of only the front side can be certainly transmitted. A facsimile apparatus which can be extremely easily used can be provided.

On the other hand, the transmission side information upon transmission of the both sides information, the communication result recording, and the communication management recording are also improved and the user can recognize that the both sides information was transmitted.

What is claimed is:

1. An image communication apparatus comprising:

read means for reading both faces of an original;

addition means for adding information representing a front face to images on the front faces of all the originals read by said read means, and for adding information representing a back face to images on the back faces of all the originals; and transmission means for transmitting the images with the information added by said addition means, wherein said addition means adds the information representing the front or the back face to the image together with a page number.

2. An apparatus according to claim 1, wherein said transmission means performs facsimile transmission.

3. An apparatus according to claim 1, wherein said transmission means alternately transmits the front and back faces of each original.

4. An image communication apparatus comprising:

read means for reading both faces of an original;

addition means for adding information representing a front face to images on the front faces of all the originals read by said read means, and for adding information representing a back face to images on the back faces of all the originals; and transmission means for transmitting the images with the information added by said addition means, wherein said addition means adds the information representing the front or the back face to the image together with a page number, wherein said addition means adds the information representing the front or the back face to the image after the page number.

5. An apparatus according to claim 4, wherein said transmission means performs facsimile transmission.

6. An apparatus according to claim 4, wherein said transmission means alternately transmits the front and back faces of each original.

7. An image communication method comprising the steps of:

reading both faces of an original;

adding information representing a front face to images on the front faces of all the originals read in said reading step, and adding information representing a back face to images on the back faces of all the originals; and transmitting the images with the information added in said adding step, wherein, in said adding step, the information representing the front or the back face is added to the image together with a page number.

8. A method according to claim 7, wherein, in said transmission step, facsimile transmission is performed.

9. An image communication method comprising the steps of:

reading both faces of an original;

adding information representing a front face to images on the front faces of all the originals read in said reading step, and adding information representing a back face to images on the back faces of all the originals; and transmitting the images with the information added in said adding step, wherein, in said adding step, the information representing the front or the back face is added to the image together with a page number, wherein, in said adding step, the information representing the front or the back face is added to the image after the page number.

10. A method according to claim 9, wherein, in said transmission step, facsimile transmission is performed.

11. An image communication apparatus comprising:

read means for reading both faces of an original;

addition means for adding information representing a front face to images on the front faces of all the originals read by said read means, and for adding information representing a back face to images on the back faces of all the originals; and transmission means for transmitting the images with the information added by said addition means.

12. An apparatus according to claim 11, wherein said transmission means performs facsimile transmission.

13. An apparatus according to claim 11, wherein said transmission means alternately transmits the front and back faces of each original.

14. An image communication method comprising the steps of:

reading both faces of an original;

adding information representing a front face to images on the front faces of all the originals read in said reading step, and adding information representing a back face to images on the back faces of all the originals; and transmitting the images with the information added in said adding step.

15. A method according to claim 14, wherein, in said transmitting step, the images are transmitted via facsimile.

16. A method according to claim 14, wherein, in said transmitting step, the front and back faces of each original are alternately transmitted.

* * * * *

UNITED STATES PATENT AND TRADEMARK OFFICE
CERTIFICATE OF CORRECTION

PATENT NO.   : 6,275,308 B1
DATED        : August 14, 2001
INVENTOR(S)  : Takehiro Yoshida Page 1 of 1

It is certified that error appears in the above-identified patent and that said Letters Patent is hereby corrected as shown below:

Title page,
Item [56], References Cited, U.S. PATENT DOCUMENTS,
"Nakabara" should read -- Nakahara --.

Column 1,
Line 54, "iD;" should read -- 1D; --.

Column 5,
Line 18, "58t," should read -- 581, --.

Column 13,
Line 2, "sides" should read -- side --.

Column 16,
Line 34, "theboth" should read -- the both --.

Signed and Sealed this

Fifth Day of March, 2002

Attest:

JAMES E. ROGAN
*Attesting Officer*   *Director of the United States Patent and Trademark Office*